(12) United States Patent
Pauls et al.

(10) Patent No.: US 7,571,766 B2
(45) Date of Patent: *Aug. 11, 2009

(54) METHODS OF FRACTURING A SUBTERRANEAN FORMATION USING A JETTING TOOL AND A VISCOELASTIC SURFACTANT FLUID TO MINIMIZE FORMATION DAMAGE

(75) Inventors: Richard W. Pauls, Duncan, OK (US); Jim B. Surjaatmadja, Duncan, OK (US); Thomas D. Welton, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 311 days.

This patent is subject to a terminal disclaimer.

(21) Appl. No.: 11/540,880

(22) Filed: Sep. 29, 2006

(65) Prior Publication Data

US 2008/0078548 A1  Apr. 3, 2008

(51) Int. Cl.
*E21B 43/267* (2006.01)
*E21B 43/114* (2006.01)
(52) U.S. Cl. .............. 166/280.1; 166/281; 166/297; 166/298; 166/311
(58) Field of Classification Search ............ None
See application file for complete search history.

(56) References Cited

U.S. PATENT DOCUMENTS

| | | | |
|---|---|---|---|
| 3,644,422 A | 2/1972 | Mine et al. ............ 260/340.9 |
| 4,324,669 A | 4/1982 | Norman et al. | |
| 4,495,389 A | 1/1985 | Place | |
| 4,585,572 A | 4/1986 | Lane et al. | |
| 4,591,447 A | 5/1986 | Kubala | |
| 4,615,825 A | 10/1986 | Teot et al. | |
| 4,646,835 A | 3/1987 | Watkins et al. | |
| 4,725,372 A | 2/1988 | Teot et al. | |
| 4,735,731 A | 4/1988 | Rose et al. | |
| 4,737,296 A | 4/1988 | Watkins | |
| 4,739,833 A | 4/1988 | Watanabe | |
| 4,770,814 A | 9/1988 | Rose et al. | |
| 4,790,958 A | 12/1988 | Teot | |
| 4,806,256 A | 2/1989 | Rose et al. | |
| 4,923,009 A | 5/1990 | Watkins | |
| 5,009,799 A | 4/1991 | Syrinek et al. | |
| 5,226,445 A | 7/1993 | Surjaatmadja | |
| 5,249,628 A | 10/1993 | Surjaatmadja | |

(Continued)

OTHER PUBLICATIONS

Search Report and Written Opinion for PCT/GB2007-003646, Sep. 25, 2007.

*Primary Examiner*—George Suchfield
(74) *Attorney, Agent, or Firm*—Robert A. Kent; Booth Albanesi & Schroeder, LLC

(57) ABSTRACT

A method of fracturing a production interval of a subterranean formation adjacent a wellbore that is open hole or has an uncemented liner is provided. The method comprises the steps of: (a) perforating a zone of the production interval by injecting a pressurized fluid through a hydrajetting tool into the subterranean formation, so as to form one or more perforation tunnels; and (b) injecting a fracturing fluid into the one or more perforation tunnels so as to create at least one fracture along each of the one or more perforation tunnels; wherein at least a portion of at least one of the pressurized fluid and the fracturing fluid comprises a viscoelastic surfactant fluid.

29 Claims, 17 Drawing Sheets

U.S. PATENT DOCUMENTS

| | | |
|---|---|---|
| 5,361,856 A | 11/1994 | Surjaatmadja et al. |
| 5,396,957 A | 3/1995 | Surjaatmadja et al. |
| 5,499,678 A | 3/1996 | Surjaatmadja et al. |
| 5,551,516 A | 9/1996 | Norman et al. |
| 5,765,642 A | 6/1998 | Surjaatmadja |
| 5,964,295 A | 10/1999 | Brown et al. |
| 6,035,936 A | 3/2000 | Whalen .................. 166/308 |
| 6,474,419 B2 | 11/2002 | Maier et al. |
| 6,662,874 B2 | 12/2003 | Surjaatmadja et al. |
| 6,719,054 B2 | 4/2004 | Cheng et al. |
| 6,725,933 B2 | 4/2004 | Middaugh et al. |
| 6,776,236 B1 | 8/2004 | Nguyen et al. |
| 6,779,607 B2 | 8/2004 | Middaugh et al. |
| 7,225,869 B2 * | 6/2007 | Willett et al. ............ 166/280.1 |
| 7,273,099 B2 * | 9/2007 | East et al. ................ 166/280.1 |
| 2003/0166471 A1 * | 9/2003 | Samuel et al. .............. 507/200 |
| 2005/0211439 A1 | 9/2005 | Willet et al. |
| 2005/0274517 A1 | 12/2005 | Blauch et al. |
| 2006/0118301 A1 | 6/2006 | East et al. |
| 2006/0180308 A1 | 8/2006 | Welton et al. |
| 2006/0180309 A1 | 8/2006 | Welton et al. |
| 2006/0180310 A1 | 8/2006 | Welton et al. |
| 2006/0183646 A1 | 8/2006 | Welton et al. |

\* cited by examiner

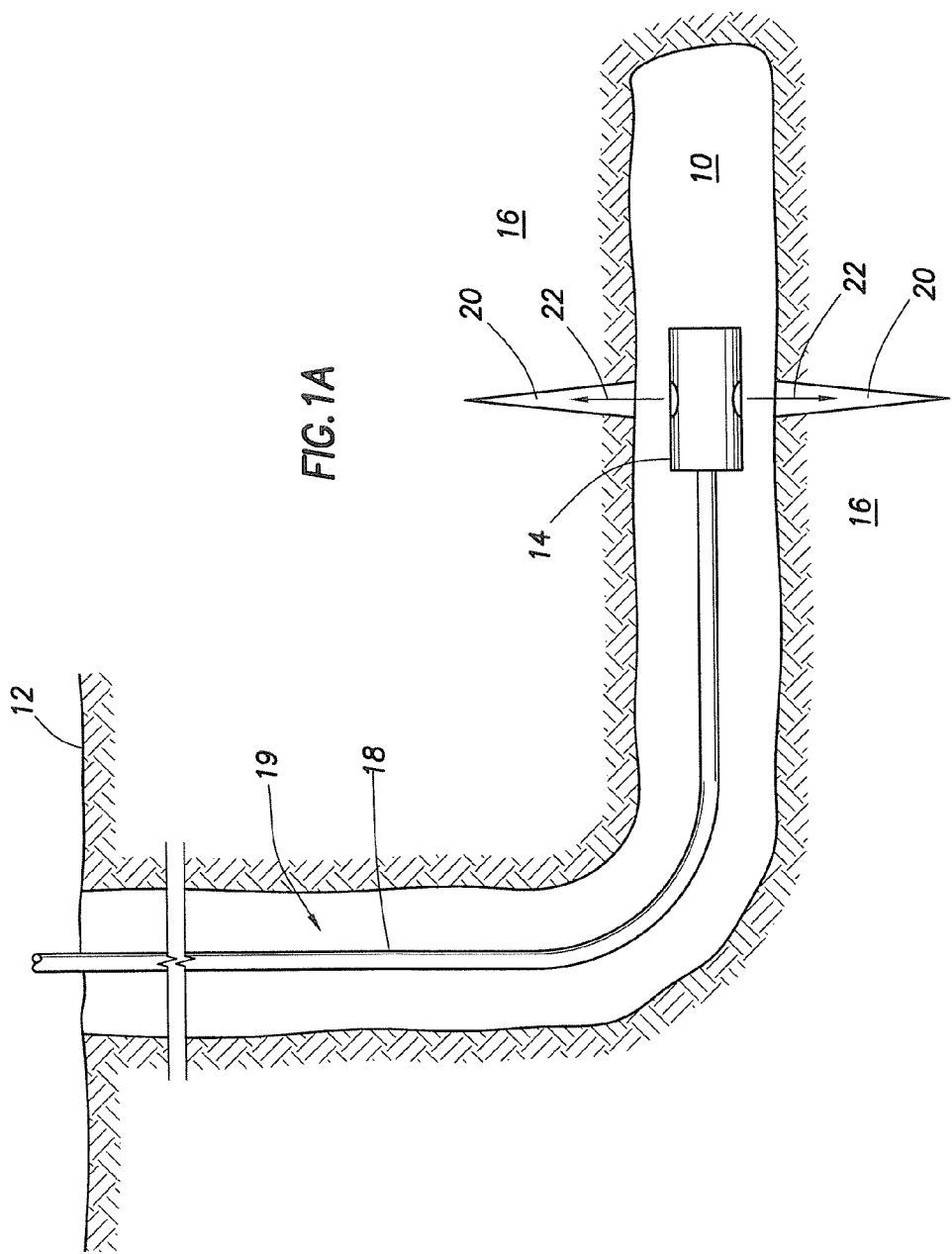

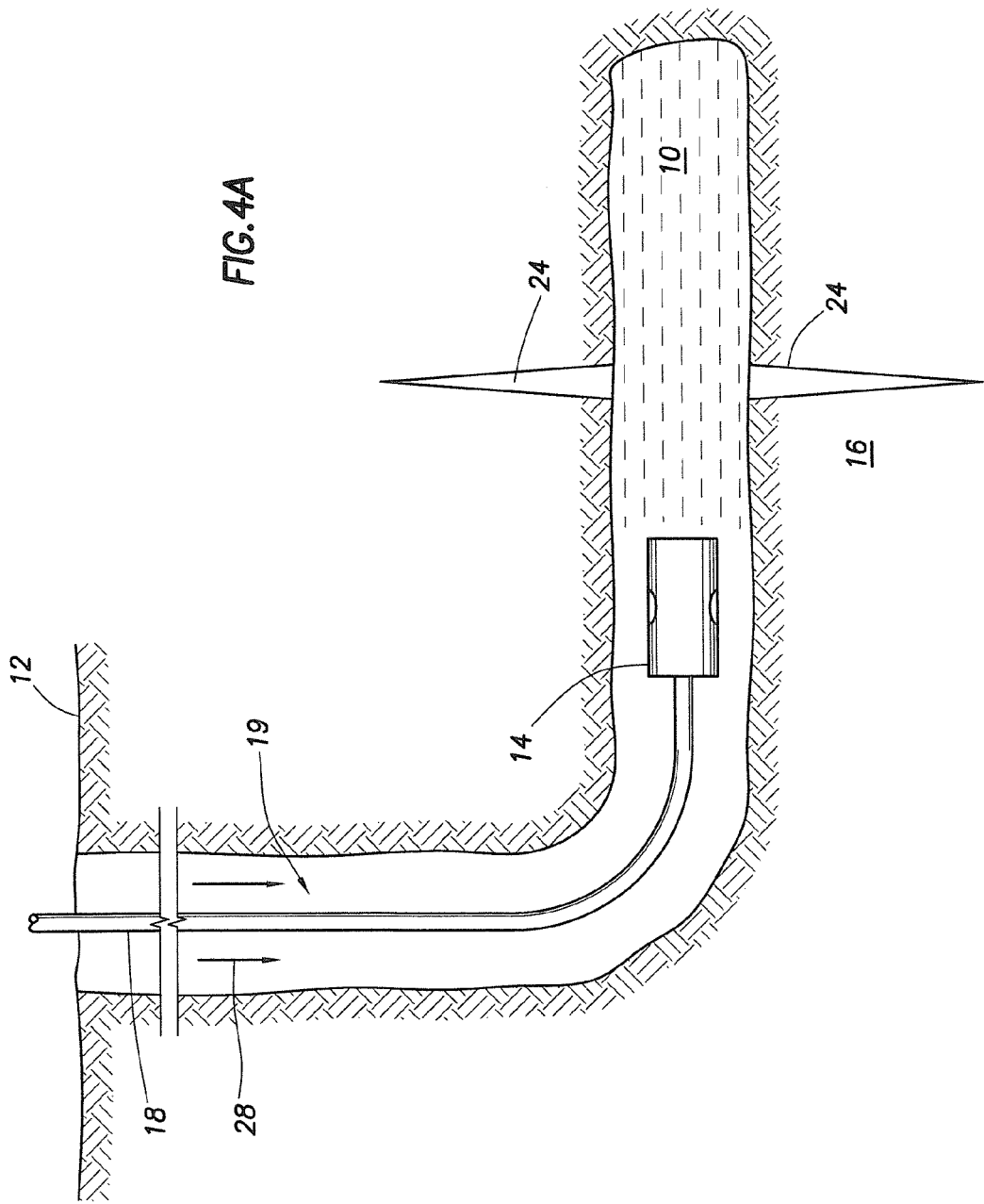

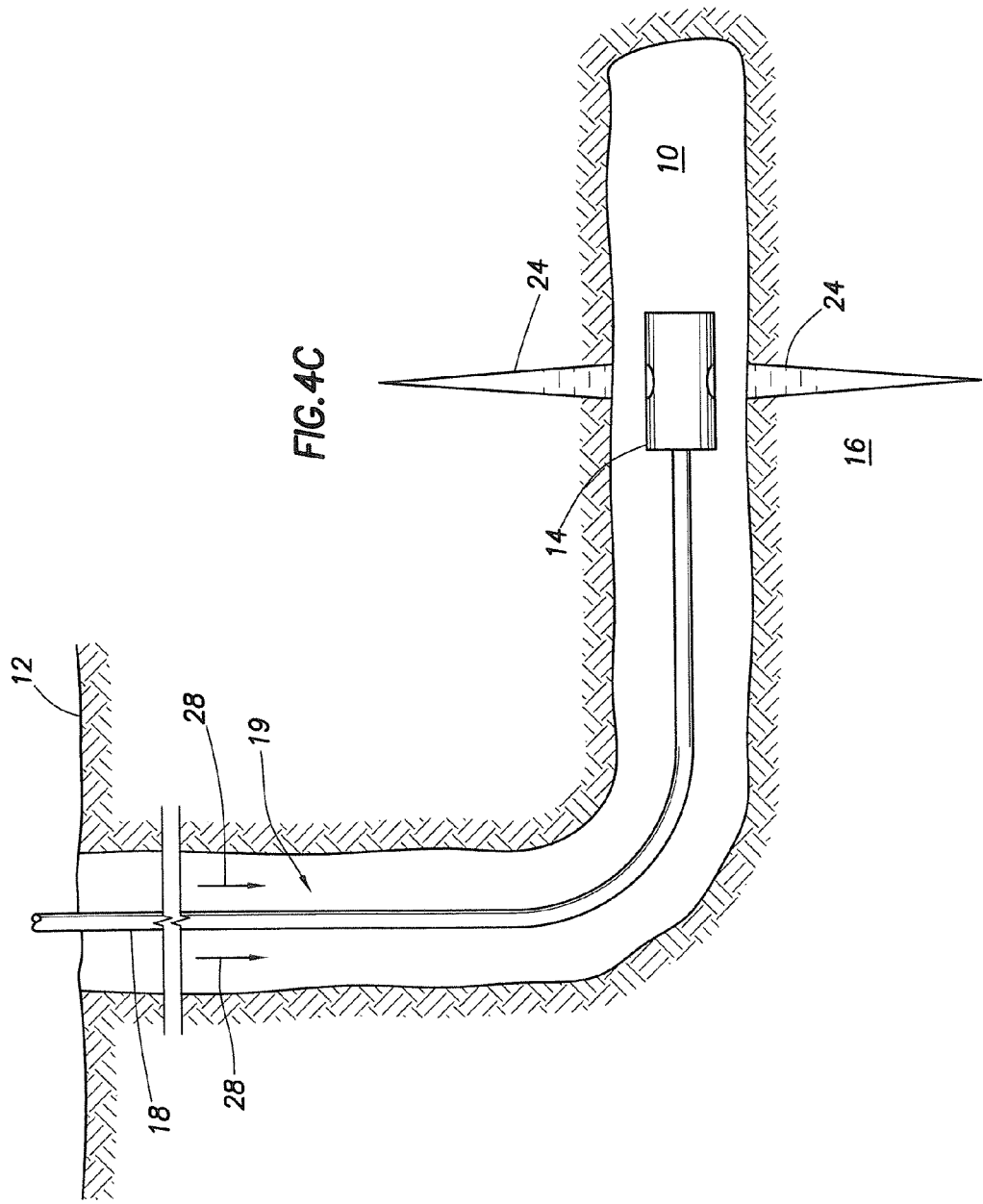

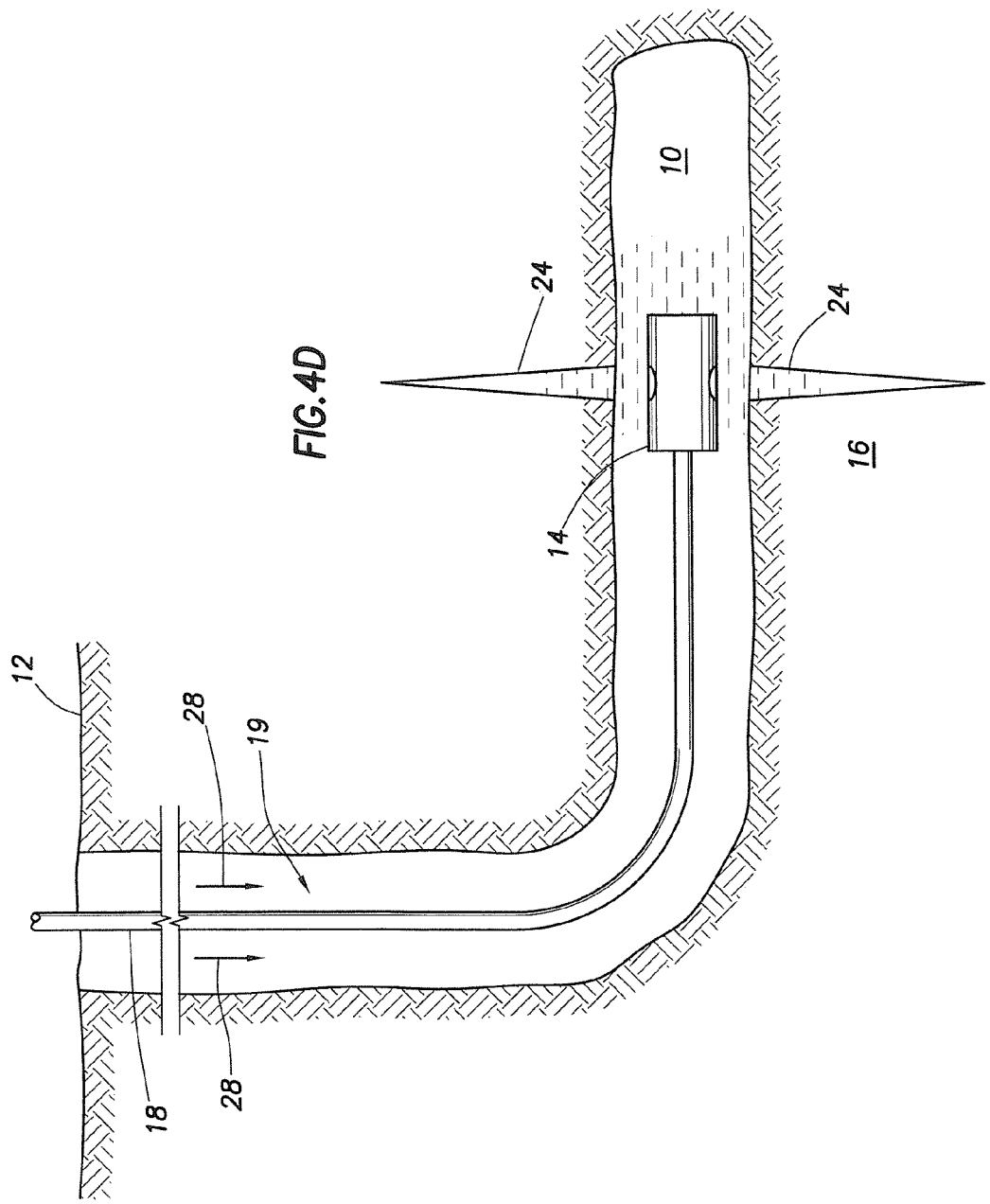

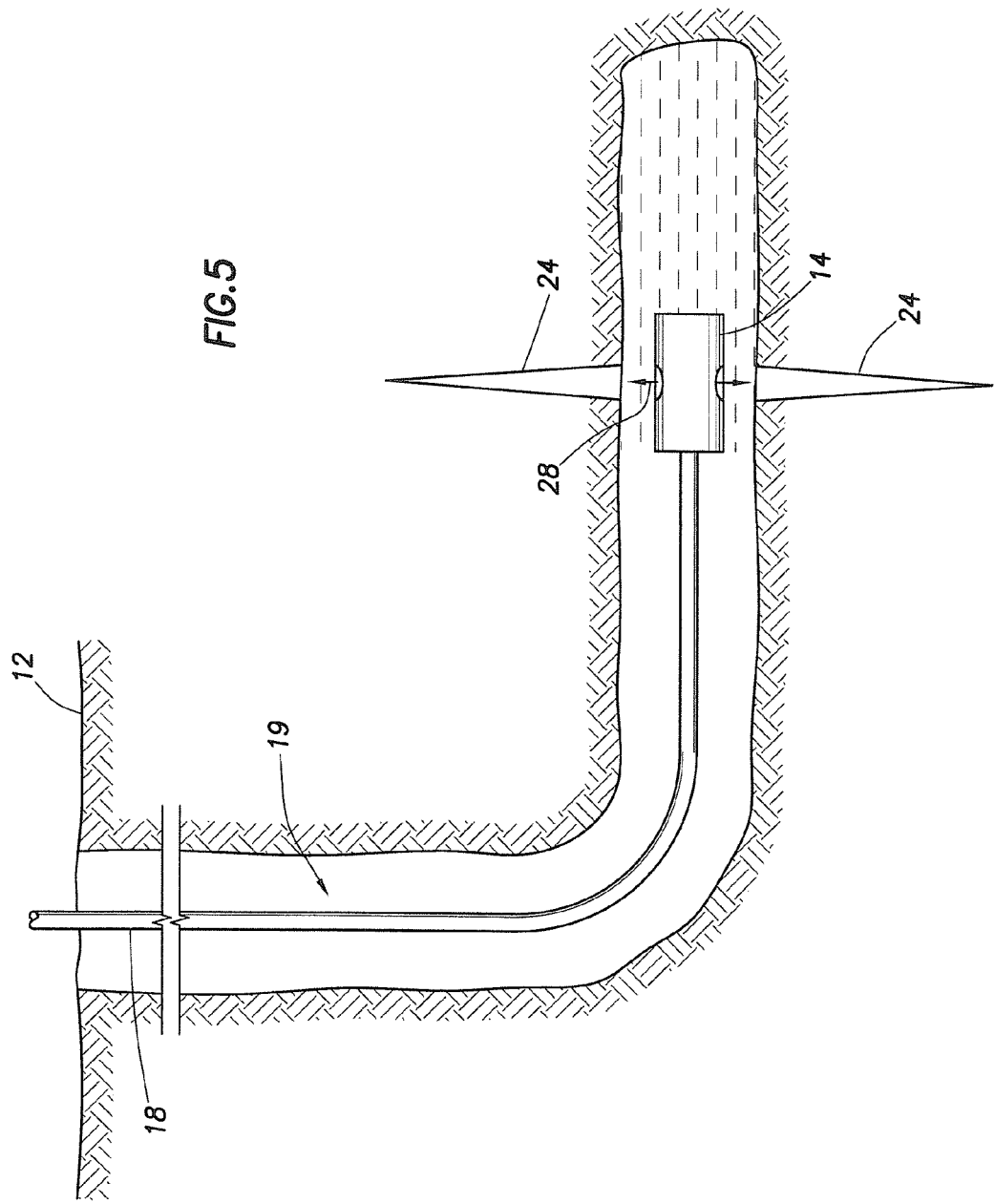

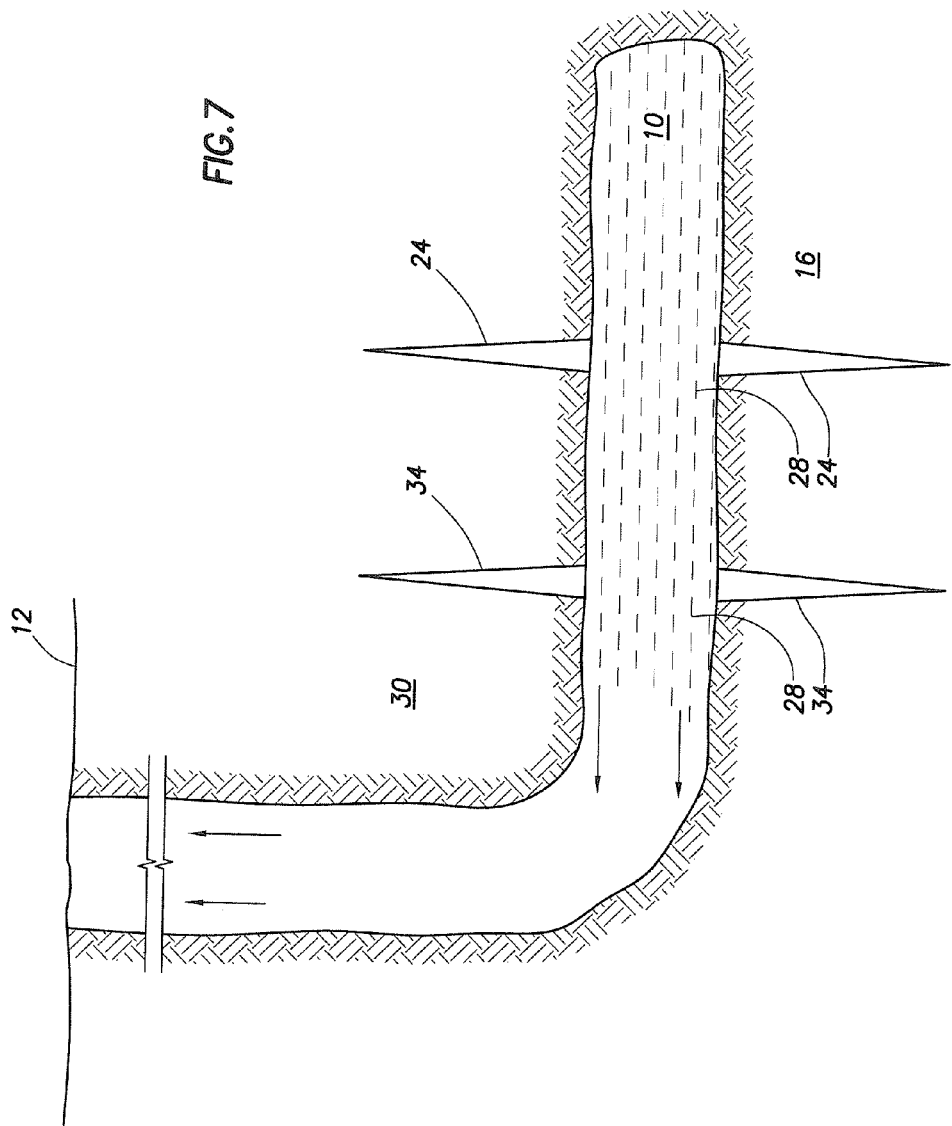

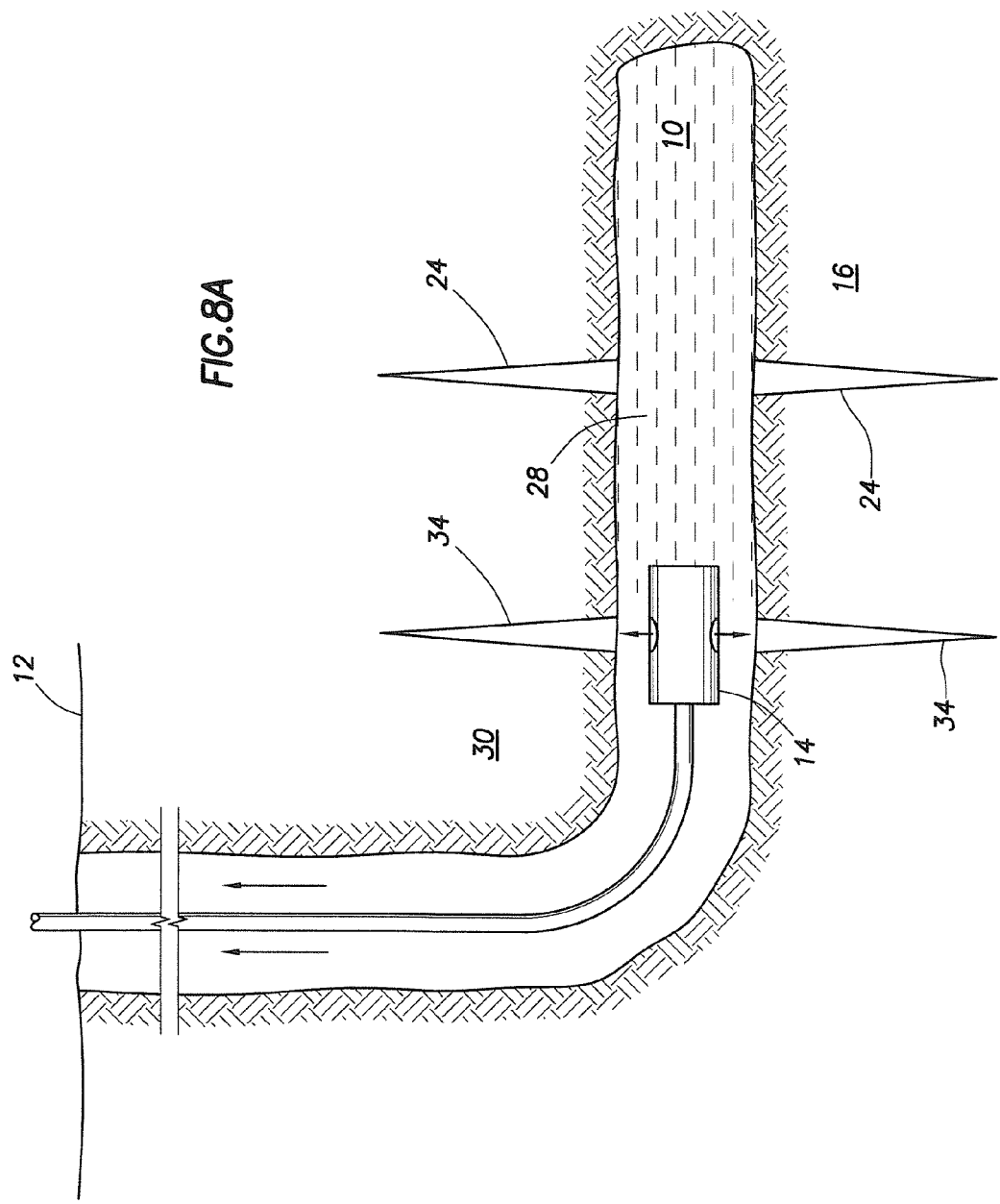

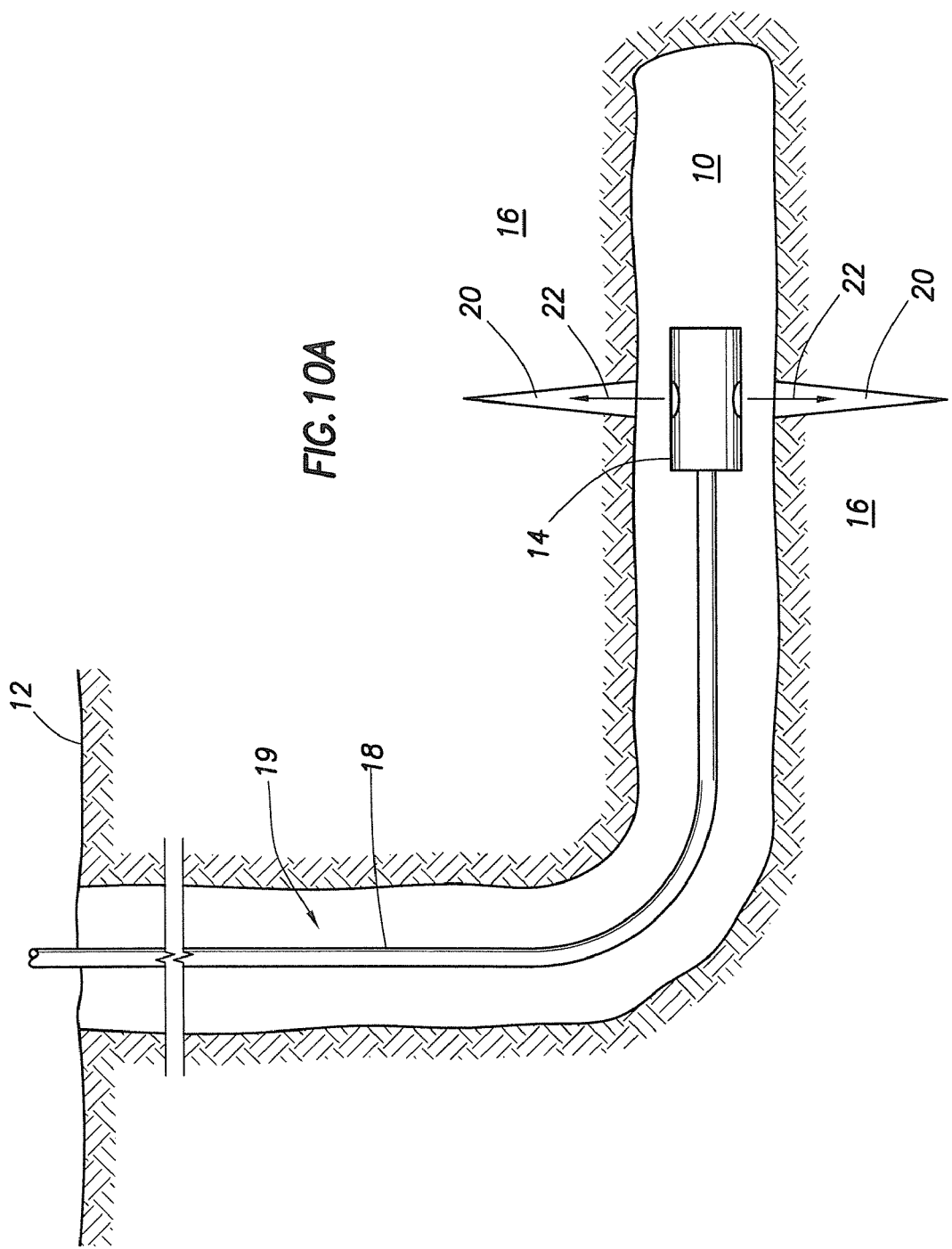

METHODS OF FRACTURING A SUBTERRANEAN FORMATION USING A JETTING TOOL AND A VISCOELASTIC SURFACTANT FLUID TO MINIMIZE FORMATION DAMAGE

CROSS-REFERENCE TO RELATED APPLICATIONS

Not applicable

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The present invention relates generally to well fracturing operations and more particularly methods of stimulation and subsequent isolation of hydrajet stimulated zones from subsequent jetting or stimulation operations, so as to minimize the loss of completion/stimulation fluids during the subsequent well jetting or stimulation operations and to minimize damage to the subterranean formations.

BACKGROUND

In some wells, it is desirable to individually and selectively create multiple fractures having adequate conductivity, usually a significant distance apart along a wellbore, so that as much of the hydrocarbons in an oil and gas reservoir as possible can be drained/produced into the wellbore.

The best known way to achieve desired hydraulic fracturing isolation/results is to cement a solid liner in the lateral section of the wellbore, perform a conventional explosive perforating step, and then perform fracturing stages along the wellbore using some technique for mechanically isolating the individual fractures.

Traditional methods to create fractures at predetermined points along a highly deviated or horizontal wellbore vary depending on the nature of the completion within the lateral (or highly deviated) section of the wellbore.

When fracturing a reservoir from a wellbore, especially those that are highly deviated or horizontal, it is difficult to control the creation of multi-zone fractures along the wellbore without cementing a liner to the wellbore and mechanically isolating the zone being fractured from previously fractured zones or zones not yet fractured. However, only a small percentage of the horizontal completions during the past 15 or more years used a cemented liner type completion; most used some type of non-cemented liner or a bare open hole section. Furthermore, many wells with cemented liners in the lateral were also completed with a significant length of open hole section beyond the cemented liner section.

More recently, Halliburton Energy Services, Inc. has introduced and proven the technology for using hydrajet perforating, jetting while fracturing, and co-injection down the annulus. In one method, this process is generally referred to by Halliburton as the SURGIFRAC® process or stimulation method and is described in U.S. Pat. No. 5,765,642, which is incorporated herein by reference. The SURGIFRAC® process has been applied mostly to horizontal or highly deviated wellbores, where casing the hole is difficult and expensive. By using this hydrajetting technique, it is possible to generate one or more independent, single plane hydraulic fractures; and therefore, highly deviated or horizontal wells can be often completed without having to case the wellbore. Furthermore, even when highly deviated or horizontal wells are cased, hydrajetting the perforations and fractures in such wells generally result in a more effective fracturing method than using traditional explosive charge perforation and fracturing techniques. Thus, prior to the SURGIFRAC® technique, methods available were usually too costly to be an economic alternative, or generally ineffective in achieving stimulation results, or both.

In view of the success of the SURGIFRAC® process, improvements and extensions of the basic SURGIFRAC® process are desirable.

Patent publications generally relating to jetting in downhole applications include the following.

U.S. Pat. No. 5,226,445 issued Jul. 13, 1993, having for named inventor Jim B. Surjaatmadja, filed on May 5, 1992 discloses in the Abstract thereof a valve that includes a seat surrounding an orifice having a concave seating surface and a plug having an annular sealing surface for sealingly contacting the seat. The sealing surface is convex and creates a convex discontinuity in an axially-extending, cross-sectional profile of the plug. The sealing surface retains approximately the same amount of contact area with the seating surface when the plug is misaligned or tilted with respect to the seat as when aligned. The entirety of U.S. Pat. No. 5,226,445 is incorporated herein by reference.

U.S. Pat. No. 5,249,628 issued Oct. 5, 1993, having for named inventor Jim B. Surjaatmadja, and filed on Sep. 29, 1992 discloses in the Abstract thereof casing slip joints provided on opposite sides of a fracture initiation location to accommodate casing and formation movement during fracturing of a well. In another aspect of the invention, the fracture initiation location is provided by forming openings through the well casing and then forming fan-shaped slots in the formation surrounding the casing. Those slots are formed by a hydraulic jet which is directed through the opening and then pivoted generally about the point of the opening. These fan-shaped slots circumscribe an angle about the axis of the casing substantially greater than the angle circumscribed by the opening itself through which the slot was formed. These techniques are particularly applicable to fracturing of horizontal wells. The entirety of U.S. Pat. No. 5,249,628 is incorporated herein by reference.

U.S. Pat. No. 5,361,856 issued Nov. 8, 1994, having for named inventors Jim B. Surjaatmadja, Steven L. Holden, and David D. Szarka, and filed on Sep. 9, 1993, discloses in the Abstract thereof a well jetting apparatus for use in fracturing of a well. Fracture initiation is provided by forming openings through the well casing and then forming fan-shaped slots in the formation surrounding the casing. Those slots are formed by the jetting apparatus which has at least one hydraulic jet directed through the opening. The apparatus may be pivoted generally about the point of the opening to form the slots, but preferably a plurality of slots are formed substantially simultaneously. These fan-shaped slots circumscribe an angle about the axis of the casing substantially greater than the angle circumscribed by the opening itself through which the slot was formed. These techniques are particularly applicable to fracturing of horizontal wells, but the apparatus may be used in any well configuration. The entirety of U.S. Pat. No. 5,361,856 is incorporated herein by reference.

U.S. Pat. No. 5,396,957 issued Mar. 14, 1995, having for named inventors Jim B. Surjaatmadja, Timothy W. Helton, and Danny G. Porter, and filed on Mar. 4, 1994 discloses in the Abstract thereof expandable casing portions, such as casing slip joints or expansion joints, on opposite sides of a fracture initiation location to accommodate casing and formation movement during fracturing of a well. The fracture initiation location provided by forming openings through the well casing and then forming fan-shaped slots in the formation surrounding the casing. These fan-shaped slots circumscribe an angle about the axis of the casing substantially greater than the angle circumscribed by the opening itself through which the slot was formed. These techniques are particularly applicable to fracturing of horizontal wells, but are also useful on vertical wells. The expansion joints formed as tubular members having alternating inner and outer annular grooves. In another embodiment, the expansion joints formed by tubular members defining alternating inner and outer spiral grooves therein. The entirety of U.S. Pat. No. 5,396,957 is incorporated herein by reference.

U.S. Pat. No. 5,499,678 issued Mar. 19, 1996, having for named inventors Jim B. Surjaatmadja, Timothy W. Helton, and Hazim H. Abass, and filed on Aug. 2, 1994 discloses in the Abstract thereof a coplanar jetting head for well perforating. The apparatus comprises a housing defining a plurality of jetting openings therein. The jetting openings are substantially coplanar and are angularly disposed with respect to a longitudinal axis of the housing. Each of the jetting openings has a jetting nozzle disposed therein. In the preferred embodiment, the angle of the plane of the jetting openings is such that the plane may be positioned substantially perpendicular to an axis of least principal stress in a well formation adjacent to the well bore when the housing is disposed in the well bore. A method of fracturing a well is also disclosed and comprises the steps of positioning a jetting head in a well bore and directing a plurality of fluid jets from the jetting head at an angle with respect to the longitudinal axis of the well bore. The entirety of U.S. Pat. No. 5,499,678 is incorporated herein by reference.

U.S. Pat. No. 5,765,642 issued Jun. 16, 1998, having for named inventor Jim B. Surjaatmadja, and filed on Dec. 23, 1996 discloses in the Abstract thereof methods of fracturing a subterranean formation, which basically comprise positioning a hydrajetting tool having at least one fluid jet forming nozzle in the well bore adjacent the formation to be fractured and jetting fluid through the nozzle against the formation at a pressure sufficient to form a fracture in the formation. The entirety of U.S. Pat. No. 5,765,642 is incorporated herein by reference.

U.S. Pat. No. 6,474,419 issued Nov. 5, 2002, having for named inventors Gary Maier, Marty L. Stromquist, and Eric Schmelzl and filed on Oct. 4, 1999 discloses in the Abstract thereof a packer with an equalizing valve for automatically equalizing the pressure above and below the packer element. The packer comprises a housing having an equalizing valve disposed therein. A packer element is disposed about the housing for sealingly engaging the wellbore. An equalizing valve is disposed in the housing and seals the housing to prevent flow therethrough when the packer element is actuated to engage the wellbore. The valve is movable in the closed position wherein communication through the housing is prevented to an open position so that the portion of the wellbore above the packer element may be communicated with a portion of the wellbore below the packer element while the element is in the set position so that pressure above and below the element may be equalized. Once the pressure is equalized, the packer can be unset and retrieved from the wellbore. The entirety of U.S. Pat. No. 6,474,419 is incorporated herein by reference.

U.S. Pat. No. 6,662,874 issued Dec. 16, 2003, having for named inventors Jim B. Surjaatmadja, Alick Cheng, and Keith A. Rispler, and filed on Sep. 28, 2001 discloses in the Abstract thereof a method of fracturing a downhole formation according to which a plurality of jet nozzles are located in a spaced relation to the wall of the formation to form an annulus between the nozzles and the formation. A non-acid containing stimulation fluid is pumped at a predetermined pressure through the nozzles, into the annulus, and against the wall of the formation, and a gas is introduced into the annulus so that the stimulation fluid mixes with the gas to generate foam before the mixture is jetted towards the formation to form fractures in the formation. The entirety of U.S. Pat. No. 6,662,874 is incorporated herein by reference.

U.S. Pat. No. 6,719,054 issued Apr. 13, 2004, having for named inventors Alick Cheng, Jim B. Surjaatmadja, Matthew J. Rees, Abraham Khallad, and Kieth A. Rispler, and filed on Sep. 28, 2001 discloses in the Abstract thereof a method of stimulating a downhole formation according to which a plurality of jet nozzles are located in a spaced relation to the wall of the formation to form an annulus between the nozzles and the formation. An acid-containing, stimulation fluid is pumped at a predetermined pressure through the nozzles, into the annulus and against the wall of the formation. A gas is pumped into the annulus so that the stimulation fluid mixes with the gas to generate foam before the mixture is jetted towards the formation to impact the wall of the formation. The entirety of U.S. Pat. No. 6,719,054 is incorporated herein by reference.

U.S. Pat. No. 6,725,933 issued Apr. 27, 2004, having for named inventors Richard L. Middaugh and Jim B. Surjaatmadja, and filed on Sep. 28, 2001 discloses in the Abstract thereof a method and apparatus for treating a subterranean well formation to stimulate the production of hydrocarbons utilizing foam diversion in the well formation. The entirety of U.S. Pat. No. 6,725,933 is incorporated herein by reference.

U.S. Pat. No. 6,776,236 issued Aug. 17, 2004, having for named inventor Phillip D. Nguyen, and filed on Oct. 16, 2002, discloses in the Abstract thereof methods of completing unconsolidated hydrocarbon producing zones penetrated by cased and cemented well bores. The methods include the steps of forming spaced openings through the casing and cement and injecting a first hardenable resin composition through the openings into the unconsolidated producing zone adjacent to the well bore. Without waiting for the first hardenable resin composition to harden, a fracturing fluid containing proppant particles coated with a second hardenable resin composition is injected through the openings into the unconsolidated producing zone at a rate and pressure sufficient to fracture the producing zone. The proppant particles coated with the second hardenable resin composition are deposited in the fractures and the first and second hardenable resin compositions are allowed to harden by heat. The entirety of U.S. Pat. No. 6,776,236 is incorporated herein by reference.

U.S. Pat. No. 6,779,607 issued Aug. 24, 2004, having for named inventors Richard L. Middaugh and Jim B. Surjaatmadja, and filed on Jun. 26, 2003 discloses in the Abstract thereof a method and apparatus or treating a subterranean well formation to stimulate the production of hydrocarbons utilizing foam diversion in the well formation. The entirety of U.S. Pat. No. 6,779,607 is incorporated herein by reference.

U.S. Patent Publication No. 20050211439 published on Sep. 28, 2005, having for named inventors Ronald M. Willett, Jim B. Surjaatmadja, and Billy W. McDaniel, and filed on Mar. 24, 2004 discloses in the Abstract thereof a method of isolating hydrajet stimulated zones from subsequent well operations. The method includes the step of drilling a wellbore into the subterranean formation of interest. Next, the wellbore may or may not be cased depending upon a number of factors including the nature and structure of the subterranean formation. Next, the casing, if one is installed, and wellbore are perforated using a high pressure fluid being ejected from a hydrajetting tool. A first zone of the subterranean formation is then fractured and stimulated. Next, the first zone is temporarily plugged or partially sealed by installing an isolation fluid into the wellbore adjacent to the one or more fractures and/or in the openings thereof, so that subsequent zones can be fractured and additional well operations can be performed. The entirety of U.S. Patent Publication No. 20050211439 is incorporated herein by reference.

U.S. Patent Publication No. 20060118301 published on Jun. 8, 2006, having for named inventors Loyd E. East, Jr., Travis W. Cavender, David J. Attaway, and filed on Dec. 3, 2004 discloses in the Abstract thereof a method of stimulating a production interval adjacent a well bore having a casing disposed therein, that comprises introducing a carrier fluid comprising first particulates into the well bore, packing the first particulates into a plurality of perforations in the casing, perforating at least one remedial perforation in the casing adjacent to the production interval, and stimulating the production interval through the at least one remedial perforation. Also provided are methods of stimulating multiple production intervals adjacent a well bore. The entirety of U.S. Patent Publication No. is incorporated herein by reference.

SUMMARY OF THE INVENTION

According to the invention, a method of fracturing a production interval of a subterranean formation adjacent a wellbore that is open hole or has an uncemented liner is provided. The method comprises the steps of: (a) perforating a zone of the production interval by injecting a pressurized fluid through a hydrajetting tool into the subterranean formation, so as to form one or more perforation tunnels; and (b) injecting a fracturing fluid into the one or more perforation tunnels so as to create at least one fracture along each of the one or more perforation tunnels; wherein at least a portion of at least one of the pressurized fluid and the fracturing fluid comprises a viscoelastic surfactant fluid.

According to another aspect of the invention, a method of fracturing a production interval of a subterranean formation adjacent a wellbore that is open hole or has an uncemented liner is provided, wherein the method comprises the steps of: (a) perforating a zone of the production interval by injecting a pressurized fluid through a hydrajetting tool into the subterranean formation, so as to form one or more perforation tunnels; (b) injecting a fracturing fluid into the one or more perforation tunnels so as to create at least one fracture along each of the one or more perforation tunnels; and (c) plugging at least partially the one or more fractures in the zone with an isolation fluid; wherein at least a portion of at least one of the pressurized fluid, the fracturing fluid. and the isolation fluid comprises a viscoelastic surfactant fluid.

It is a general object of the present invention to provide improved methods for fracturing a portion of a subterranean formation with a viscoelastic surfactant fluid using a jetting tool. Other and further objects, features and advantages of the present invention will be readily apparent to those skilled in the art when the following description of the preferred embodiments is read in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, which:

FIG. 1A is a schematic diagram illustrating a hydrajetting tool creating perforation tunnels through an uncased horizontal wellbore in a first zone of a subterranean formation.

FIG. 4A is a schematic diagram illustrating one embodiment according to the present invention wherein the fractures in the first zone are plugged or partially sealed with an isolation fluid delivered through the wellbore annulus after the hydrajetting tool has moved up hole.

FIG. 4C is a schematic diagram illustrating another embodiment according to the present invention wherein the isolation fluid plugs the inside of the fractures rather than the wellbore alone.

FIG. 4D is a schematic diagram illustrating another embodiment according to the present invention wherein the isolation fluid plugs the inside of the fractures and at least part of the wellbore.

FIG. 5 is a schematic diagram illustrating another embodiment according to the present invention wherein the isolation fluid is delivered into the wellbore through the hydrajetting tool.

FIG. 7 is a schematic diagram illustrating one exemplary method of removing the isolation fluid from the wellbore in the subterranean formation by allowing the isolation fluid to flow out of the well with production.

FIGS. 8A and 8B are schematic diagrams illustrating two other exemplary methods of removing the isolation fluid from the fractures in the subterranean formation.

FIGS. 10A-C illustrate yet another exemplary method of fracturing multiple zones in a subterranean formation and plugging or partially sealing those zones in accordance with the present invention.

DETAILED DESCRIPTION

Figure 1B:
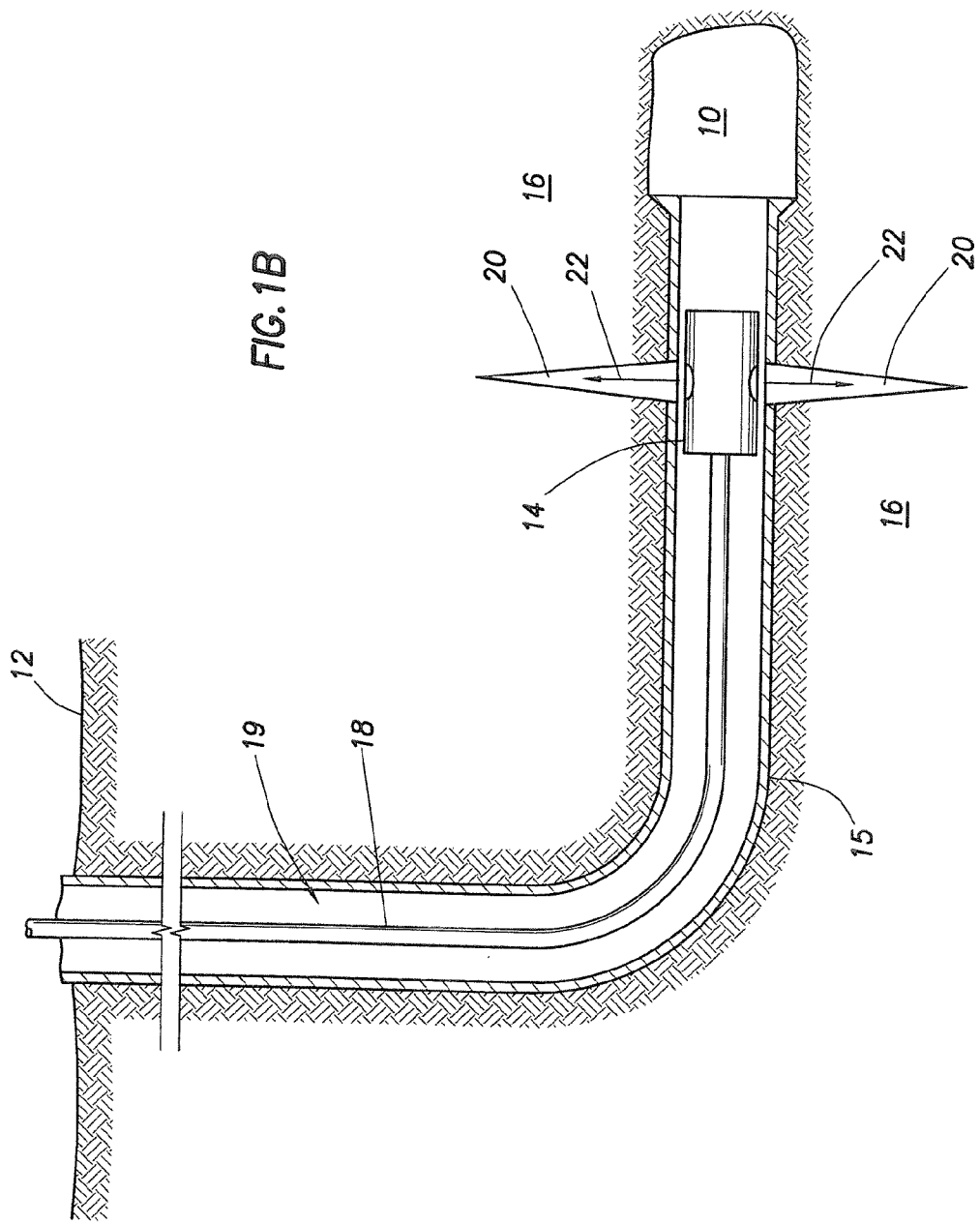
FIG. 1B is a schematic diagram illustrating a hydrajetting tool creating perforation tunnels through a cased horizontal wellbore in a first zone of a subterranean formation.

As used herein and in the appended claims, the words "comprise," "has," and "include" and all grammatical variations thereof are each intended to have an open, non-limiting meaning that does not exclude additional elements or parts of an assembly, subassembly, or structural element.

If there is any conflict in the usages of a word or term in this specification and one or more patent or other documents that may be incorporated herein by reference, the definitions that are consistent with this specification should be adopted.

There is some concern about the cleanup of polymer gelled acids utilized in treating subterranean formations. Because currently uncased, deviated or horizontal wells are being acidized with polymer gelled acids, it would be desirable to offer a new approach.

Further, acidizing with polymer gelled acids using SURGIFRAC® in injection wells is of additional concern because injection wells are typically not used to produce, exacerbating the concern about cleanup of the polymer gelled acids. Thus, new methods would be particularly desirable for injection wells.

In general, according to the invention, a method of fracturing a production interval of a subterranean formation adjacent a wellbore that is open hole or has an uncemented liner is provided. The method comprises the steps of: (a) perforating a zone of the production interval by injecting a pressurized fluid through a hydrajetting tool into the subterranean formation, so as to form one or more perforation tunnels; and (b) injecting a fracturing fluid into the one or more perforation tunnels so as to create at least one fracture along each of the one or more perforation tunnels; wherein at least a portion of the fracturing fluid comprises a viscoelastic surfactant fluid.

According to another aspect of the invention, a method of fracturing a production interval of a subterranean formation adjacent a wellbore that is open hole or has an uncemented liner is provided, wherein the method comprises the steps of: (a) perforating a zone of the production interval by injecting a pressurized fluid through a hydrajetting tool into the subterranean formation, so as to form one or more perforation tunnels; (b) injecting a fracturing fluid into the one or more perforation tunnels so as to create at least one fracture along each of the one or more perforation tunnels; and (c) plugging at least partially the one or more fractures in the zone with an isolation fluid; wherein at least a portion of at least one of the fracturing fluid and the isolation fluid comprises a viscoelastic surfactant fluid.

The pressurized fluid, the fracturing fluid, and isolation fluid can all be viscoelastic surfactant fluids. Preferably, the pressurized fluid, the fracturing fluid, and the isolation fluid are substantially free of polymeric materials.

According to the invention, this would allow the use of polymer free fluids in hydrojetting techniques for a wellbore that is open hole or has an uncemented liner.

According to another or further aspect, the methods of the present invention may further comprise perforating at least one remedial perforation adjacent to a production interval. These perforations are referred to as "remedial" because they are created after an initial completion process has been performed in the well. Further, the at least one remedial perforation may be created in one or more previously perforated intervals and/or one or more previously unperforated intervals.

Patent publications generally relating to viscoelastic compositions include U.S. Pat. Nos. 4,324,669; 4,495,389; 4,591,447; 4,737,296; 4,585,572; 4,615,825; 4,646,835; 4,725,372; 4,735,731; 4,739,833; 4,770,814; 4,790,958; 4,806,256; 4,923,009; 5,009,799; 5,551,516; and 5,964,295, and U.S. Patent Application Nos. 20060183646, 20060180310, 20060180309, and 20060180308, each of which is incorporated herein by reference.

For example, U.S. Pat. No. 4,324,669, having for named inventors Lewis R. Norman and Tommy R. Gardner, and filed on Nov. 19, 1979 discloses in the Abstract thereof foamed high viscosity aqueous inorganic acid solutions and methods of treating subterranean well formations using such solutions are provided. The foamed acid solutions are comprised of water, at least one water-soluble inorganic acid, a gelling-foaming agent comprised of a solution of a water-soluble organic solvent and an ethoxylated fatty amine or a mixture of such amines and an inert gas. The entirety of U.S. Pat. No. 4,324,669 is incorporated herein by reference.

U.S. Pat. No. 4,806,256, having for named inventors Gene D. Rose and Arthur S. Teot, and filed on Jan. 13, 1987 discloses in the Abstract thereof Water-based hydraulic fluids are thickened by admixing the fluid with a viscoelastic surfactant. Viscoelastic surfactants comprise surfactant ions and organic counterions that associate with the hydraulic fluid to form the viscoelastic surfactant. Water-based hydraulic fluids of this invention are highly shear stable and do not experience substantial viscosity loss with an increase in temperature. The hydraulic fluids are capable of providing low amounts of wear in pumping apparatus during use. The entirety of U.S. Pat. No. 4,806,256 is incorporated herein by reference.

U.S. Pat. No. 5,551,516 issued Sep. 3, 1996, having for named inventors William D. Norman, Ramond J. Jasinski, and Erik B. Nelson, and filed on Feb. 17, 1995 discloses in the Abstract thereof viscoelastic surfactant based aqueous fluid systems that are useful in fracturing subterranean formations penetrated by a wellbore. The preferred thickening agents are quaternary ammonium halide salts derived from certain waxes, fats and oils. The thickening agent is used in conjunction with an inorganic water-soluble salt such as ammonium chloride or potassium chloride, and an organic stabilizing additive selected from the group of organic salts such as sodium salicylate. The resulting fluids are stable to a fluid temperature of about 225° F. The entirety of U.S. Pat. No. 5,551,516 is incorporated herein by reference.

Figure 2:
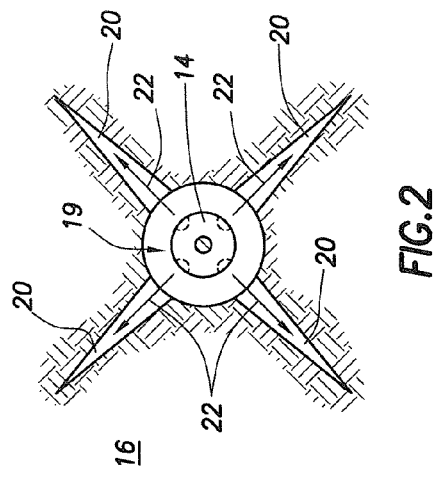
FIG. 2 is a schematic diagram illustrating a cross-sectional view of the hydrajetting tool shown in FIG. 1 forming four equally spaced perforation tunnels in the first zone of the subterranean formation.

The details of the method according to the present invention will now be described with reference to the accompanying drawings. First, a wellbore 10 is drilled into the subterranean formation of interest 12 using conventional (or future) drilling techniques. Next, depending upon the nature of the formation, the wellbore 10 is either left open hole, as shown in FIG. 1A, or lined with an uncemented liner 15, as shown in FIG. 1B. The wellbore 10 may be left as an uncased open hole if, for example, the subterranean formation is highly consolidated or in the case where the well is a highly deviated or horizontal well, which are often difficult to line with cemented casing. Furthermore, when an uncemented liner is positioned in the wellbore, the liner may be either a slotted or preperforated liner or a solid liner. Those of ordinary skill in the art will appreciate the circumstances when the wellbore 10 should or should not be lined, and whether the liner should be slotted, preperforated or solid. Furthermore, while FIGS. 2 through 10 illustrate the steps of the present invention being carried out in an wellbore without any liner, those of ordinary skill in the art will recognize that each of the illustrated and described steps can be carried out in a lined wellbore. The method can also be applied to an older well bore that has zones that are in need of stimulation Once the wellbore 10 is drilled, and if deemed necessary lined, a hydrajetting tool 14, such as that used in the SURGIFRAC® process described in U.S. Pat. No. 5,765,642, is placed into the wellbore 10 at a location of interest, e.g., adjacent to a first zone 16 in the subterranean formation 12. In one exemplary embodiment, the hydrajetting tool 14 is attached to a coil tubing 18, which lowers the hydrajetting tool 14 into the wellbore 10 and supplies it with jetting fluid. Annulus 19 is formed between the coil tubing 18 and the wellbore 10. The hydrajetting tool 14 then operates to form perforation tunnels 20 in the first zone 16, as shown in FIG. 1. The perforation fluid being pumped through the hydrajetting tool 14 contains a base fluid, which is commonly water and abrasives (commonly sand). As shown in FIG. 2, four equally spaced jets (in this example) of fluid 22 are injected into the first zone 16 of the subterranean formation 12. As those of ordinary skill in the art will recognize, the hydrajetting tool 14 can have any number of jets, configured in a variety of combinations along and around the tool.

Figure 3:
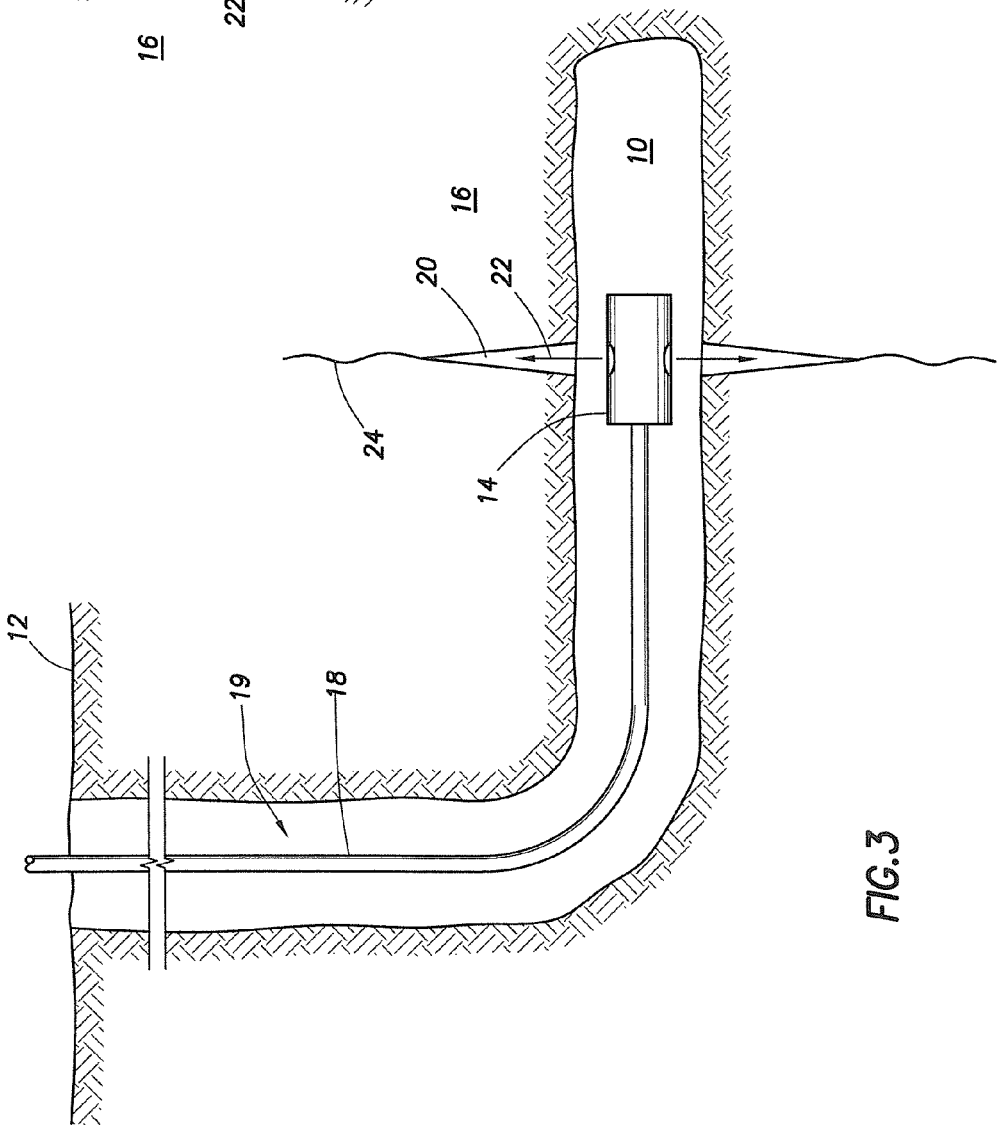
FIG. 3 is a schematic diagram illustrating the creation of fractures in the first zone by the hydrajetting tool wherein the plane of the fracture(s) is perpendicular to the wellbore axis.

In the next step of the method according to the present invention, the first zone 16 is fractured. Preferably, the hydrajetting tool 14 injects a high pressure fracturing fluid into the perforation tunnels 20. As those of ordinary skill in the art will appreciate, the pressure of the fracture fluid exiting the hydrajetting tool 14 can be sufficient to fracture the formation in the first zone 16. Using this technique, the jetted fluid forms cracks or fractures 24 along the perforation tunnels 20, as shown in FIG. 3.

According to a presently preferred embodiment of the invention, the fracturing fluid preferably comprises a viscoelastic surfactant fluid. Without being limited by any theoretical explanation, it is believed that a viscoelastic surfactant fluid will help minimize damage to the formation.

In an exemplary embodiment, the jetted fluid preferably carries a proppant into the cracks or fractures 24. The injection of additional fluid extends the fractures 24 and the proppant prevents them from closing up at a later time.

The present invention contemplates that other fracturing methods may be employed. For example, the one or more perforation tunnels 20 can be fractured by pumping a hydraulic fracturing fluid into them from the surface through annulus 19 in which the hydrajetting tool is disposed so as to initiate and propagate a fracture.

It is often desirable to include an acidizing fluid with the fracturing fluid, wherein at least a portion of at least one of the fracturing fluid further comprises an acidizing fluid for etching the formation. In an exemplary embodiment, the step of injecting a fracturing fluid can further comprise injecting a viscoelastic surfactant fluid and an acidizing fluid as a commingled fluid or intermittently.

It is also often desirable that in a subsequent step to fracturing, an acidizing fluid be injected into the formation. The acidizing fluid can be injected through the hydrajetting tool 14 or through the annulus 19. The acidizing fluid etches the formation along the cracks 24 thereby creating channels of high conductivity along the fracture faces.

Once the first zone 16 has been fractured, the present invention provides for isolating the first zone 16, so that subsequent well operations, such as the fracturing of additional zones, can be carried out without the loss of significant amounts of fluid. This isolation step can be carried out in a number of ways. In one preferred and exemplary embodiment, the isolation step is carried out by injecting into the wellbore 10 an isolation fluid 28, which can have a higher viscosity than the fracturing fluid already in the fracture or the wellbore.

According to a presently preferred embodiment of the invention, the isolation fluid preferably comprises a viscoelastic surfactant fluid. Without being limited by any theoretical explanation, it is believed that a viscoelastic surfactant fluid will help fluid cleanup and minimize damage to the formation.

According to the invention, in an acidizing treatment the isolation fluid preferably does not include any substantial amount of particulate that is substantially smaller than the proppant to avoid plugging the interstitial spaces between the proppant placed in the fracture with smaller particulate.

Figure 4B:
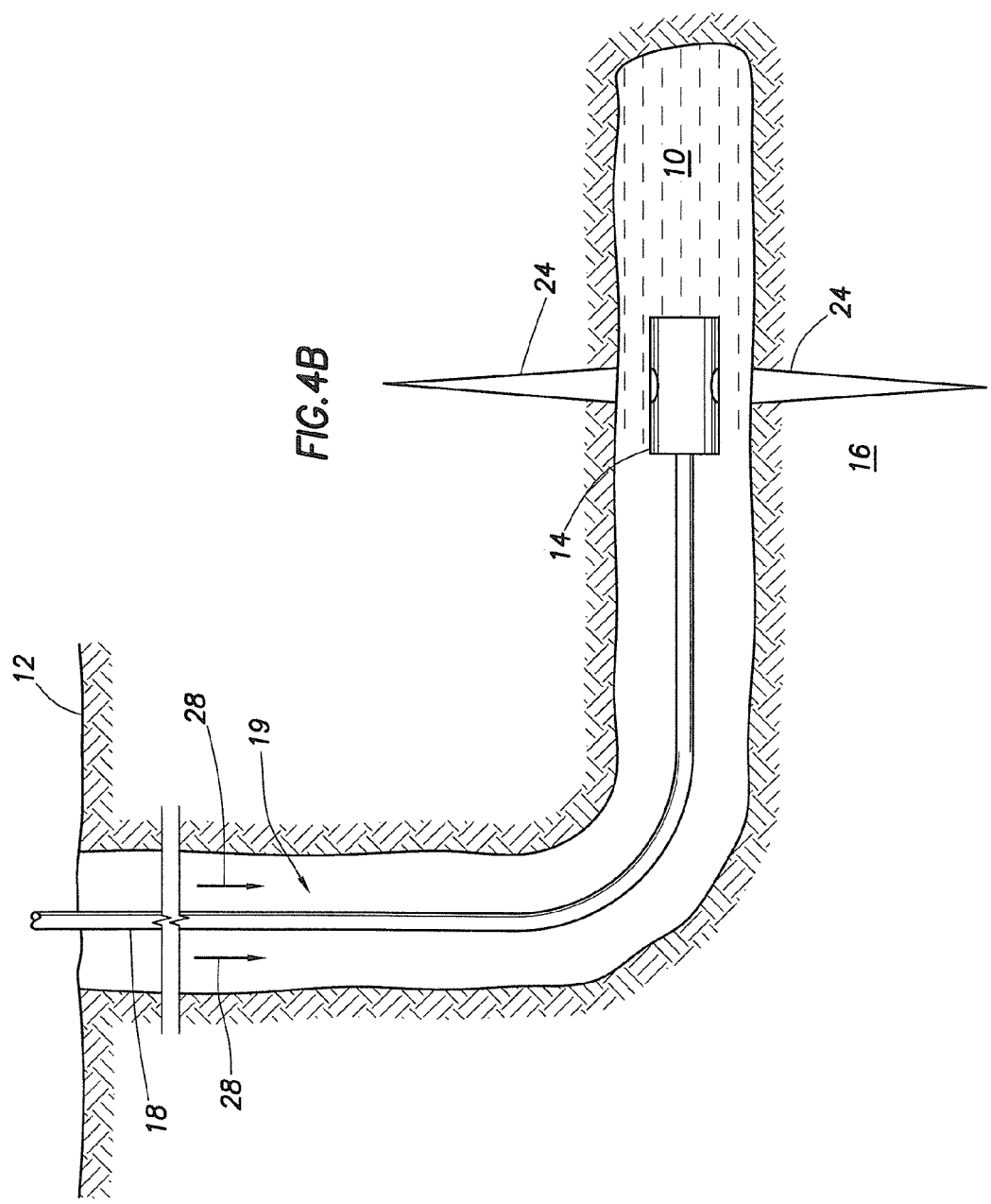
FIG. 4B is a schematic diagram illustrating another embodiment according to the present invention wherein the fractures in the first zone are plugged or partially sealed with an isolation fluid delivered through the wellbore annulus before the hydrajetting tool has moved up hole.
Figure 6:
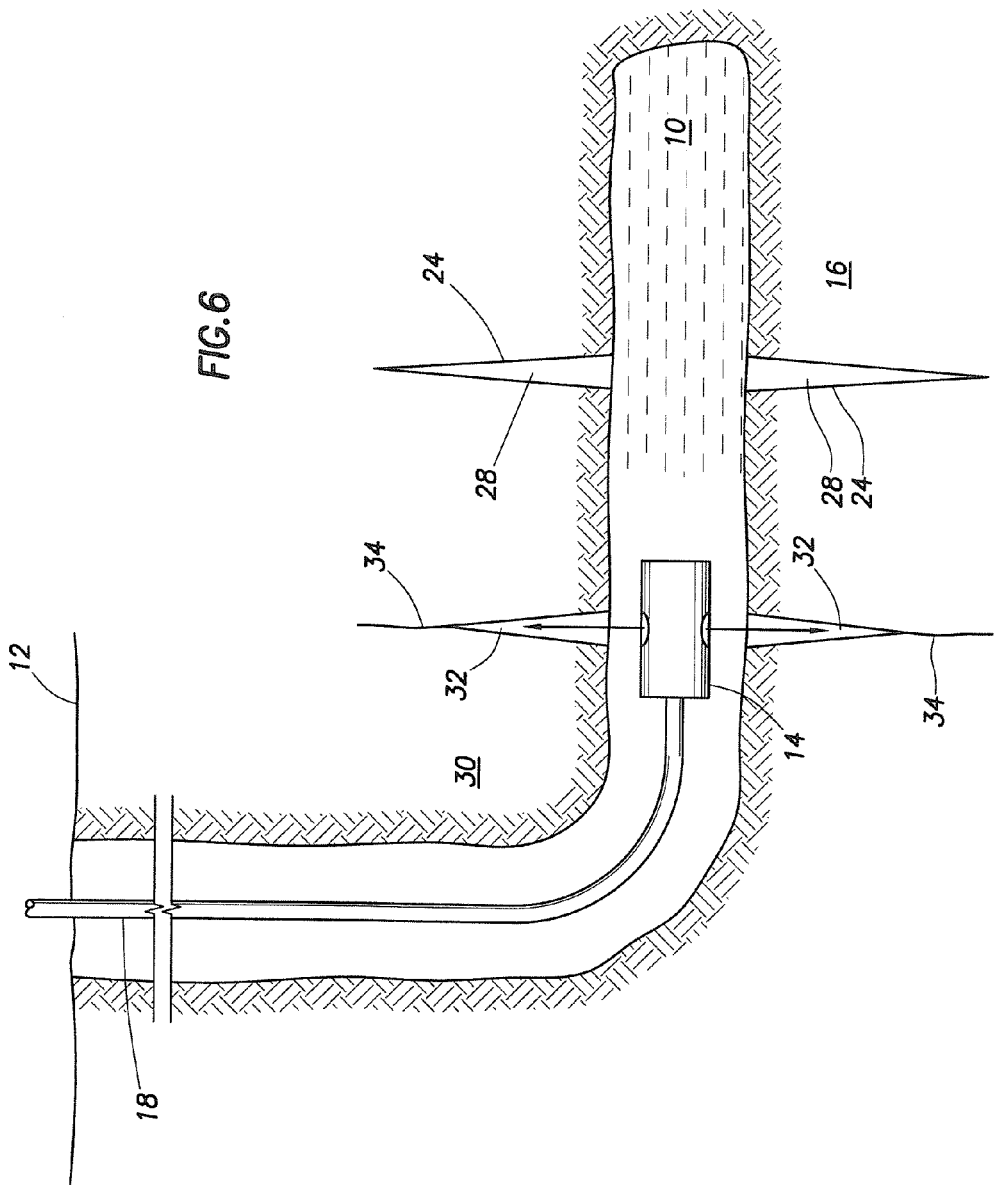
FIG. 6 is a schematic diagram illustrating the creation of fractures in a second zone of the subterranean formation by the hydrajetting tool after the first zone has been plugged.

In one embodiment, the isolation fluid 28 is injected into the wellbore 10 by pumping it from the surface down the annulus 19. More specifically, the isolation fluid 28, which is preferably highly viscous, is squeezed out into the annulus 19 and then washed downhole using a lower viscosity fluid. In one implementation of this embodiment, the isolation fluid 28 is not pumped into the wellbore 10 until after the hydrajetting tool 14 has moved up hole, as shown in FIG. 4A. In another implementation of this embodiment, the isolation fluid 28 is pumped into the wellbore 10, possibly at a reduced injection rate than the fracturing operation, before the hydrajetting tool 14 has moved up hole, as shown in FIG. 4B. If the isolation fluid is particularly highly viscous or contains a significant concentration of solids, preferably the hydrajetting tool 14 is moved out of the zone being plugged or partially sealed before the isolation fluid 28 is pumped downhole because the isolation fluid may impede the movement of the hydrajetting tool within the wellbore 10.

In the embodiments shown in FIGS. 4A and 4B, the isolation fluid is shown in the wellbore 10 alone. Alternatively, the isolation fluid could be pumped into the jetted perforations and/or the opening of the fractures 24, as shown in FIG. 4C. In still another embodiment, the isolation fluid is pumped both in the opening of the fractures 24 and partially in the wellbore 10, as shown in FIG. 4D.

In another exemplary embodiment of the present invention, the isolation fluid 28 is injected into the wellbore 10 adjacent the first zone 16 through the jets 22 of the hydrajetting tool 14, as shown in FIG. 5. In this embodiment, the chemistry of the isolation fluid 28 must be selected such that it does not substantially set up until after in has been injected into the wellbore 10. Preferably, however, the isolation fluid is a viscoelastic surfactant fluid.

In another exemplary embodiment, the isolation fluid 28 is formed of a fluid having a similar chemical makeup as the fluid resident in the wellbore during the fracturing operation. Preferably, the isolation fluid has a greater viscosity than such resident fluid, however.

In one exemplary embodiment, the wellbore fluid is mixed with a solid material to form the isolation fluid. The solid material may include natural and man-made proppant agents, such as silica, ceramics, and bauxites, or any such material that has an external coating of any type. Alternatively, the solid (or semi-solid) material may include paraffin, encapsulated acid or other chemical, or resin beads. According to the invention, however, in an acidizing treatment the isolation fluid preferably does not include any substantial amount of particulate that is substantially smaller than the proppant to avoid plugging the interstitial spaces between the proppant placed in the fracture with smaller particulate.

In another exemplary embodiment, the isolation fluid 28 is formed of a highly viscous material, such as a viscoelastic surfactant fluid, a gel, or a cross-linked gel. Most preferably, the isolation fluid 28 is a viscoelastic fluid. Examples of other gels that can be used as the isolation fluid include, but are not limited to, fluids with high concentration of gels such as guar, HEC, or modified guar. Examples of cross-linked gels that can be used as the isolation fluid include, but are not limited to, high concentration gels such as Halliburton's DELTA FRAC fluids or K-MAX fluids. "Heavy crosslinked gels" could also be used by mixing the crosslinked gels with delayed chemical breakers, encapsulated chemical breakers, which will later reduce the viscosity, or with a material such as PLA (poly-lactic acid) beads, which although being a solid material, with time decomposes into acid, which will liquefy the K-MAX fluids or other crosslinked gels.

After the isolation fluid 28 is delivered into the wellbore 10 adjacent the fractures 24, a second zone 30 in the subterranean formation 12 can be fractured. If the hydrajetting tool 14 has not already been moved within the wellbore 10 adjacent to the second zone 30, as in the embodiment of FIG. 4A, then it is moved there after the first zone 16 has been plugged or partially sealed by the isolation fluid 28. Once adjacent to the second zone 30, as in the embodiment of FIG. 6, the hydrajetting tool 14 operates to perforate the subterranean formation in the second zone 30 thereby forming perforation tunnels 32. Next, the subterranean formation 12 is fractured to form fractures 34 either using conventional techniques or more preferably the hydrajetting tool 14. Next, the fractures 34 are extended by continued fluid injection and using proppant agents, acidizing fluids, or both as noted above, or any other known technique for holding the fractures 34 open and conductive to fluid flow at a later time. The fractures 34 can then be plugged or partially sealed by the isolation fluid 28 using the same techniques discussed above with respect to the fractures 24. The method can be repeated where it is desired to fracture additional zones within the subterranean formation 12.

Figure 8B:
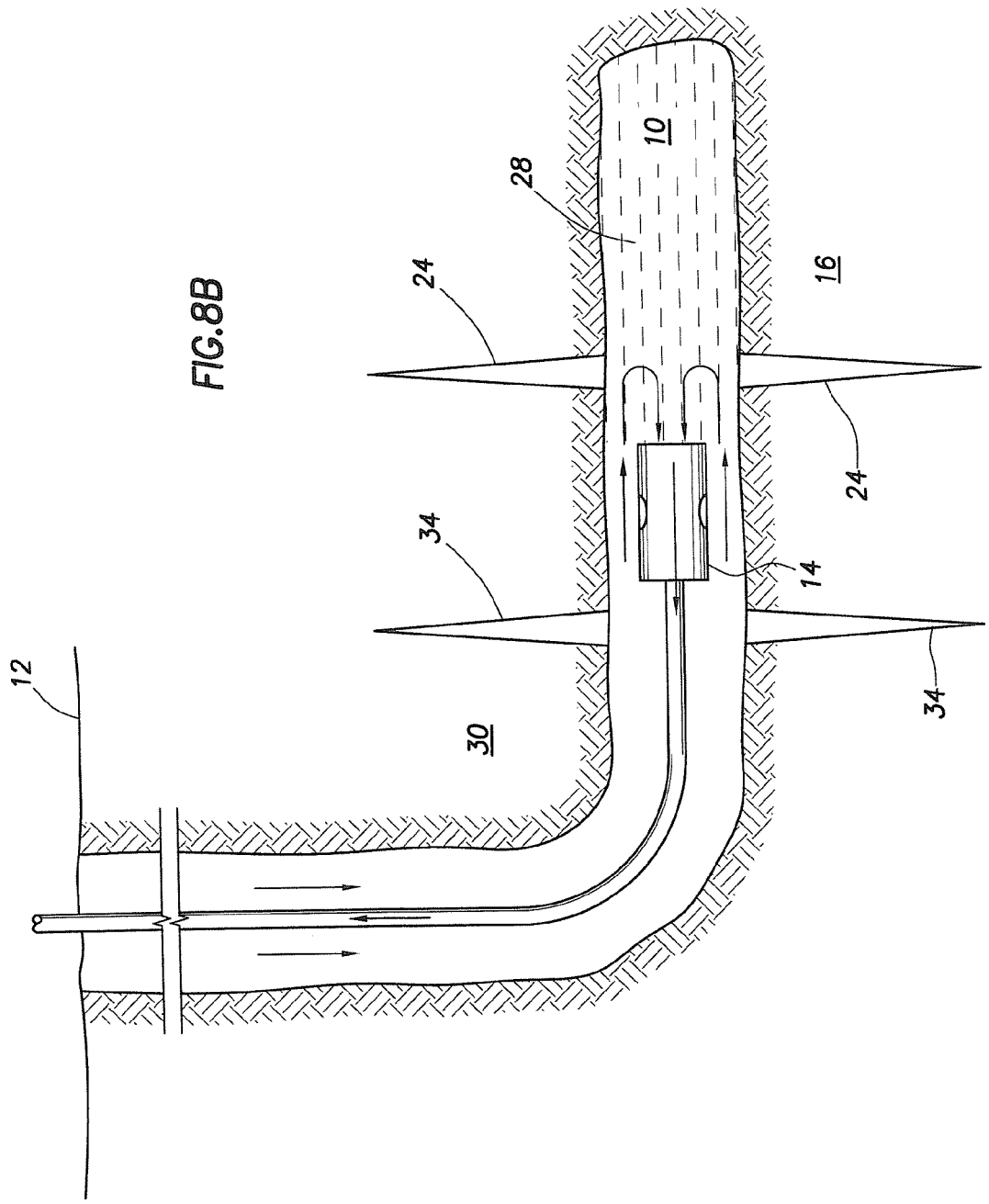

Once all of the desired zones have been fractured, the isolation fluid 28 can be recovered thereby unplugging the fractures 24 and 34 for subsequent use in the recovery of hydrocarbons from the subterranean formation 12. One method would be to allow the production of fluid from the well to move the isolation fluid, as shown in FIG. 7. The isolation fluid may consist of chemicals that break or reduce the viscosity of the fluid over time to allow easy flowing. Another method of recovering the isolation fluid 28 is to wash or reverse the fluid out by circulating a fluid, gas or foam into the wellbore 10, as shown in FIG. 8A. Another alternate method of recovering the isolation fluid 28 is to hydrajet it out using the hydrajetting tool 14, as shown in FIG. 8B. The latter methods are particularly well suited where the isolation fluid 28 contains solids and the well is highly deviated or horizontal.

The following is another method of completing a well in a subterranean formation in accordance with the present invention. First, the wellbore 10 is drilled in the subterranean formation 12. Next, the first zone 16 in the subterranean formation 12 is perforated by injecting a pressurized fluid through the hydrajetting tool 14 into the subterranean formation (FIG. 9A), so as to form one or more perforation tunnels 20, as shown, for example, in FIG. 9B. During the performance of this step, the hydrajetting tool 14 is kept stationary. Alternatively, however, the hydrajetting tool 14 can be fully or partially rotated so as to cut slots into the formation. Alternatively, the hydrajetting tool 14 can be axially moved or a combination of rotated and axially moved within the wellbore 10 so as to form a straight or helical cut or slot. Next, one or more fractures 24 are initiated in the first zone 16 of the subterranean formation 12 by injecting a fracturing fluid into the one or more perforation tunnels through the hydrajetting tool 14, as shown, for example, in FIG. 3. Initiating the fracture with the hydrajetting tool 14 is advantageous over conventional initiating techniques because this technique allows for a lower breakdown pressure on the formation. Furthermore, it results in a more accurate and better quality perforation.

Figure 9A:
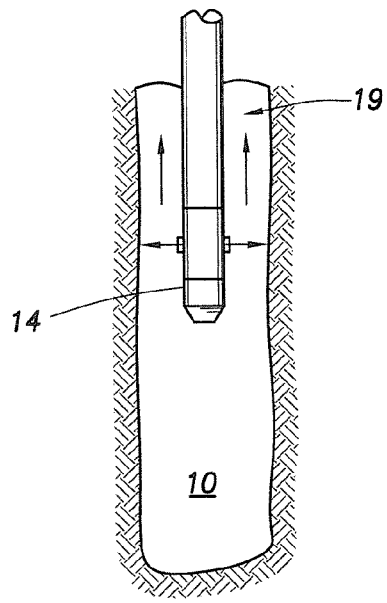
FIGS. 9A-9D illustrate another exemplary method of fracturing multiple zones in a subterranean formation and plugging or partially sealing those zones in accordance with the present invention.
Figure 9C:
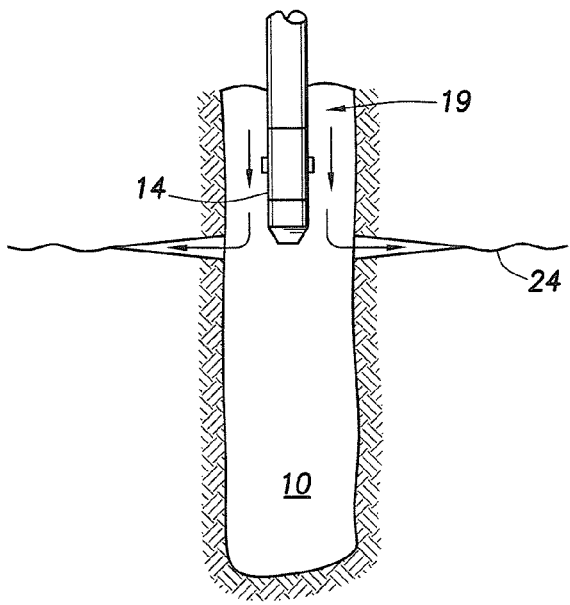
Figure 9B:
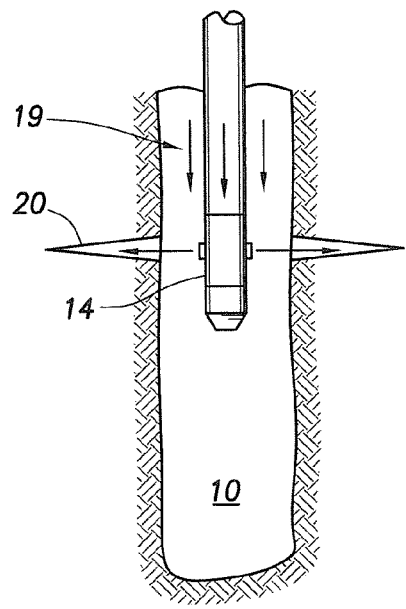
Figure 9D:
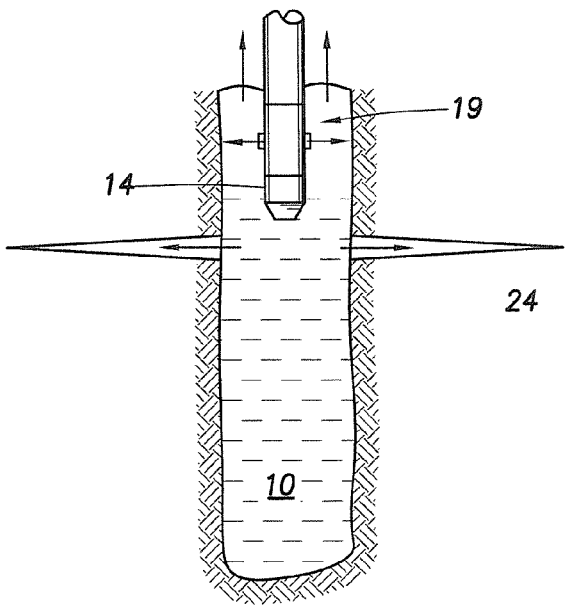

Fracturing fluid can be pumped down the annulus 19 as soon as the one or more fractures 24 are initiated, so as to propagate the fractures 24, as shown in FIG. 9B, for example. A fracturing fluid can be a surfactant gel, a polymer gel, oil gel, emulsion, foam, etc. For example, a polymer gel can comprise a polysaccarhide, such as guar, hydroxyethylcelulose ("HEC"), and modified or derivatives of any of the foregoing. Any cuttings left in the annulus from the perforating step are pumped into the fractures 24 during this step. After the fractures 24 have been initiated, the hydrajetting tool 14 is moved up hole. This step can be performed while the fracturing fluid is being pumped down through the annulus 19 to propagate the fractures 24, as shown in FIG. 9C. The rate of fluid being discharged through the hydrajetting tool 14 can be decreased once the fractures 24 have been initiated. The annulus injection rate may or may not be increased at this juncture in the process.

After the fractures 24 have been propagated and the hydrajetting tool 14 has been moved up hole, the isolation fluid 28 in accordance with the present invention can be pumped into the wellbore 10 adjacent to the first zone 16. Over time the isolation fluid 28 plugs the one or more fractures 24 in the first zone 16, as shown, for example, in FIG. 9D. (Although not shown, those of skill in the art will appreciate that the isolation fluid 28 can permeate into the fractures 24.) The steps of perforating the formation, initiating the fractures, propagating the fractures and plugging or partially sealing the fractures are repeated for as many additional zones as desired, although only a second zone 30 is shown in FIGS. 6-10.

After all of the desired fractures have been formed, the isolation fluid 28 can be removed from the subterranean formation 12. There are a number of ways of accomplishing this in addition to flowing the reservoir fluid into the wellbore and to those already mentioned, namely reverse circulation and hydrajetting the fluid out of the wellbore 10. In another method, acid is pumped into the wellbore 10 so as to activate, de-activate, or dissolve the isolation fluid 28 in situ. In yet another method, nitrogen is pumped into the wellbore 10 to flush out the wellbore and thereby remove it of the isolation fluid 28 and other fluids and materials that may be left in the wellbore.

Yet another method in accordance with the present invention will now be described. First, as with the other methods, wellbore 10 is drilled. Next, first zone 16 in subterranean formation 12 is perforated by injecting a pressurized fluid through hydrajetting tool 14 into the subterranean formation, so as to form one or more perforation tunnels 20. The hydrajetting tool 14 can also be rotated or rotated and/or axially moved during this step to cut slots into the subterranean formation 12. Next, one or more fractures 24 are initiated in the first zone 16 of the subterranean formation by injecting a fracturing fluid into the one or more perforation tunnels 20 through the hydrajetting tool 14. Following this step or simultaneous with it, additional fracturing fluid is pumped into the one or more fractures 24 in the first zone 16 through annulus 19 in the wellbore 10 so as to propagate the fractures 24. Any cuttings left in the annulus after the drilling and perforation steps may be pumped into the fracture during this step. Simultaneous with this latter step, the hydrajetting tool 14 is moved up hole. Pumping of the fracture fluid into the formation through annulus 19 is then ceased. All of these steps are then repeated for the second zone 30 and any subsequent zones thereafter. The rate of the fracturing fluid being ejected from the hydrajetting tool 14 is decreased as the tool is moved up hole and even may be halted altogether.

An additional method in accordance with the present invention will now be described. First, as with the other methods, wellbore 10 is drilled. Next, first zone 16 in subterranean formation 12 is perforated by injecting a pressurized fluid through hydrajetting tool 14 into the subterranean formation, so as to form one or more perforation tunnels 20. The hydrajetting tool 14 can be rotated during this step to cut slots into the subterranean formation 12. Alternatively, the hydrajetting tool 14 can be rotated and/or moved axially within the wellbore 10, so as to create a straight or helical cut into the formation 16. Next, one or more fractures 24 are initiated in the first zone 16 of the subterranean formation by injecting a fracturing into the one or more perforation tunnels or cuts 20 through the hydrajetting tool 14. Following this step or simultaneous with it, additional fracturing fluid is pumped into the one or more fractures 24 in the first zone 16 through annulus 19 in the wellbore 10 so as to propagate the fractures 24. Any cuttings left in the annulus after the drilling and perforation steps are pumped into the fracture during this step. Simultaneous with this latter step, the hydrajetting tool 14 is moved up hole and operated to perforate the next zone. The fracturing fluid is then ceased to be pumped down the annulus 19 into the fractures, at which time the hydrajetting tool starts to initiate the fractures in the second zone. The process then repeats.

Figure 10B:
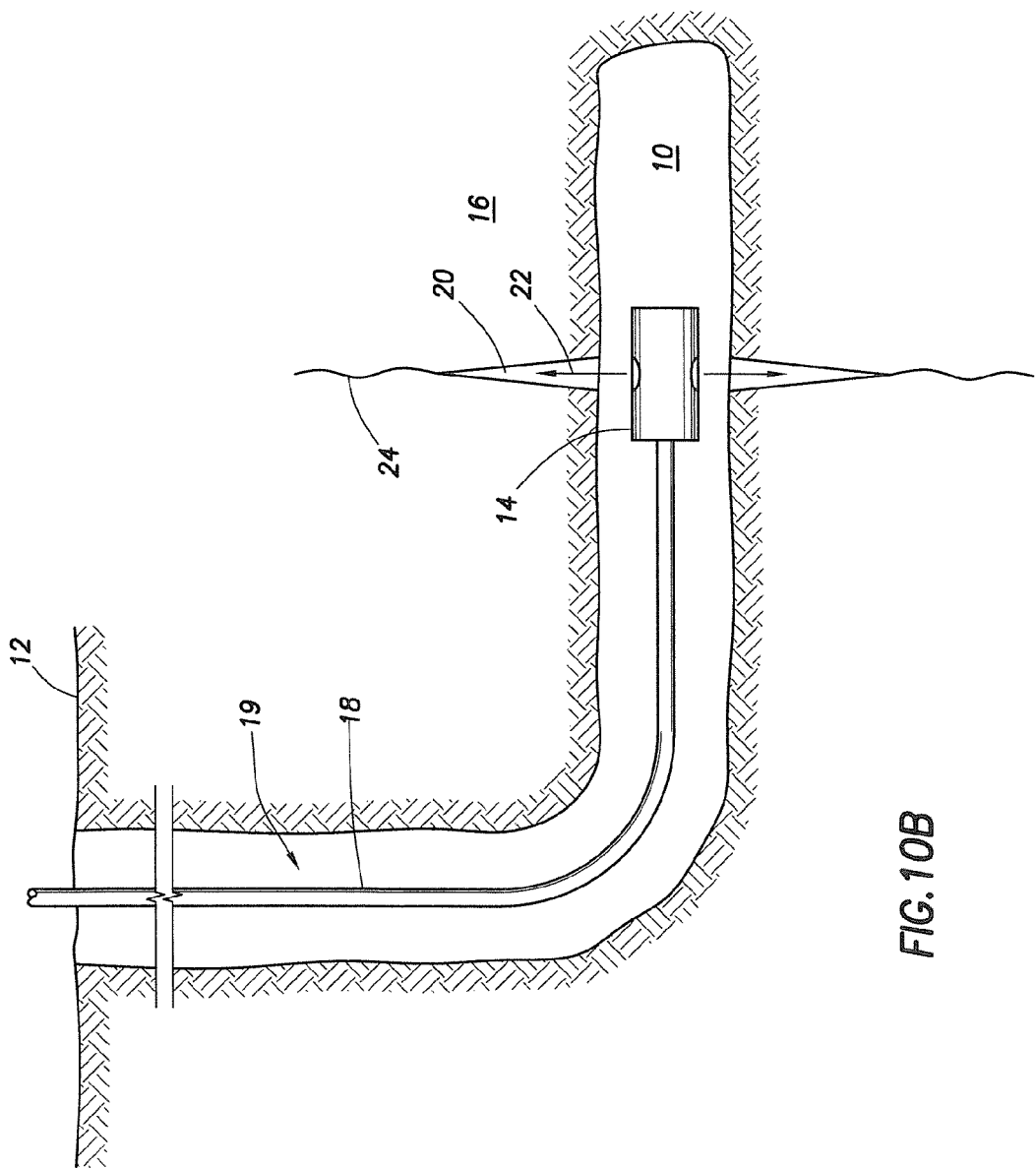
Figure 10C:
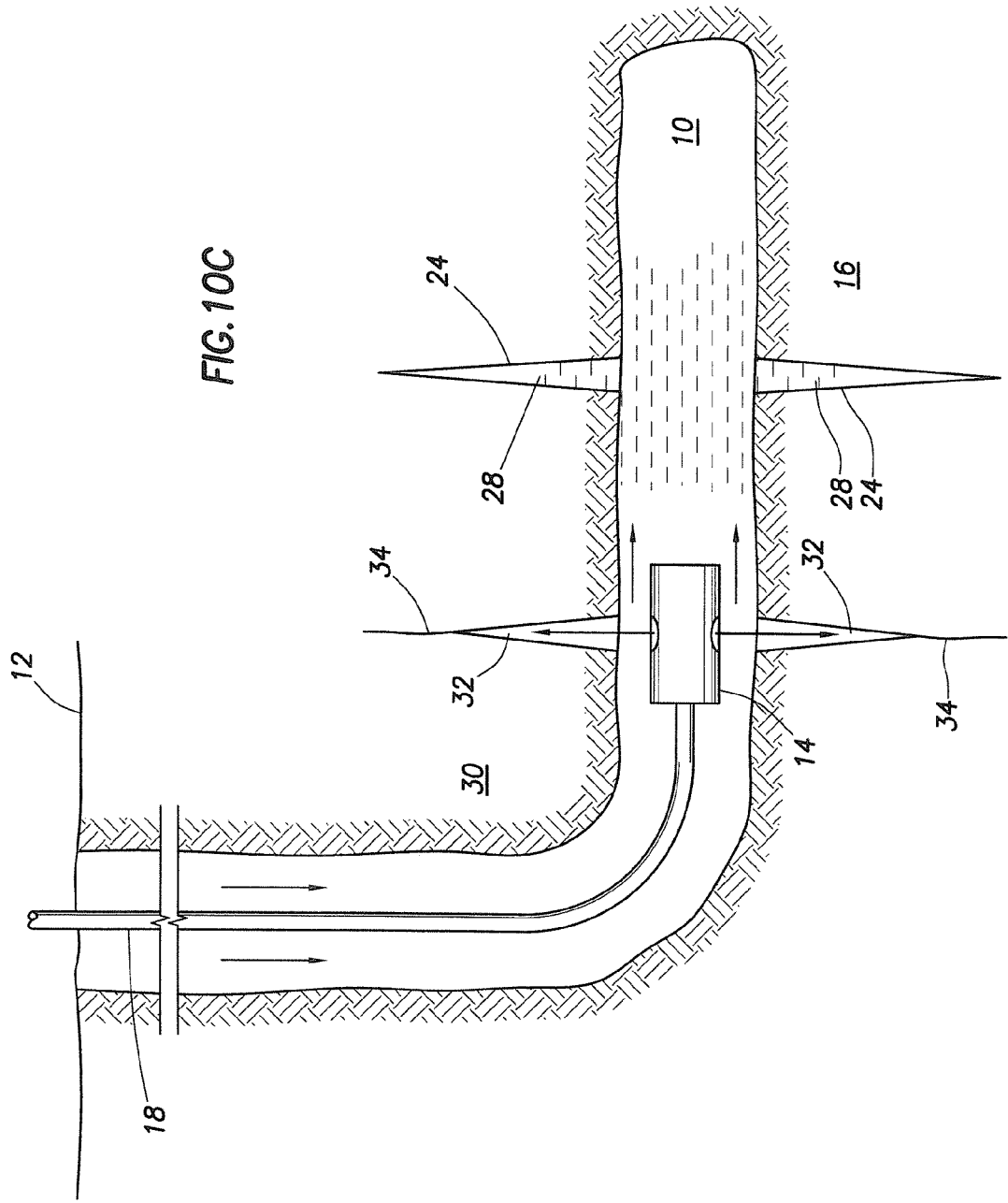

Yet another method in accordance with the present invention will now be described with reference to FIGS. 10A-C. First, as with the other methods, wellbore 10 is drilled. Next, first zone 16 in subterranean formation 12 is perforated by injecting a pressurized fluid through hydrajetting tool 14 into the subterranean formation, so as to form one or more perforation tunnels 20, as shown in FIG. 10A. The pressurized fluid can advantageously be a viscoelastic surfactant fluid. The fluid injected into the formation during this step typically contains an abrasive to improve penetration. The hydrajetting tool 14 can be rotated during this step to cut a slot or slots into the subterranean formation 12. Alternatively, the hydrajetting tool 14 can be rotated and/or moved axially within the wellbore 10, so as to create a straight or helical cut into the formation 16.

Next, one or more fractures 24 are initiated in the first zone 16 of the subterranean formation by injecting a fracturing fluid into the one or more perforation tunnels or cuts 20 through the hydrajetting tool 14, as shown in FIG. 10B. During this step the base fluid injected into the subterranean formation may contain a very small size particle, such as a 100 mesh silica sand, which is also known as Oklahoma No. 1. Next, a second fracturing fluid that may or may not have a second viscosity greater than that of the first fracturing fluid, is injected into the fractures 24 to thereby propagate said fractures. The second fracturing fluid comprises the base fluid, sand, possibly a crosslinker, and one or both of an adhesive and consolidation agent. In one embodiment, the adhesive is SANDWEDGE conductivity enhancer manufactured by Halliburton and the consolidation agent is EXPEDITE consolidation agent also manufactured by Halliburton. The present invention also includes embodiments with the use of one or more aqueous tackifiers in at least a portion of the fracturing fluid, wherein the aqueous tackifiers are of the type disclosed in U.S. Patent Publication No. 20050274517 published Dec. 15, 2005 and having for named inventors Matthew E. Blauch; Thomas D. Welton; and Philip D. Nguyen, which is incorporated herein by reference in its entirety. The second fracturing fluid may be delivered in one or more of the ways described herein. Also, an acidizing step may also be performed.

Next, the hydrajetting tool 14 is moved to the second zone 30, where it perforates that zone thereby forming perforation tunnels or cuts 32. Next, the fractures 34 in the second zone 30 are initiated using the above described technique or a similar technique. Next, the fractures 34 in the second zone are propagated by injecting a second fluid similar to above, i.e., the fluid containing the adhesive and/or consolidation agent into the fractures. Enough of the fracturing fluid is pumped downhole to fill the wellbore and the openings of fractures 24 in the first zone 16. This occurs as follows. The high temperature downhole causes the sand particles in the fracture fluid to bond to one another in clusters or as a loosely packed bed and thereby form an in situ plug. Initially, some of the fluid, which flows into the jetted tunnels and possibly part way into fractures 24 being concentrated as part of the liquid phase, leaks out into the formation in the first zone 16, but as those of ordinary skill in the art will appreciate, it is not long before the openings become plugged or partially sealed. Once the openings of the fractures 24 become filled, enough fracture fluid can be pumped down the wellbore 10 to fill some or all of the wellbore 10 adjacent fractures 24, as shown in FIG. 10C. Ultimately, enough fracture fluid and proppant can be pumped downhole to cause the first zone 16 to be plugged or partially sealed. This process is then repeated for subsequent zones after subsequent perforating and fracturing stages uphole.

Figure 11A:
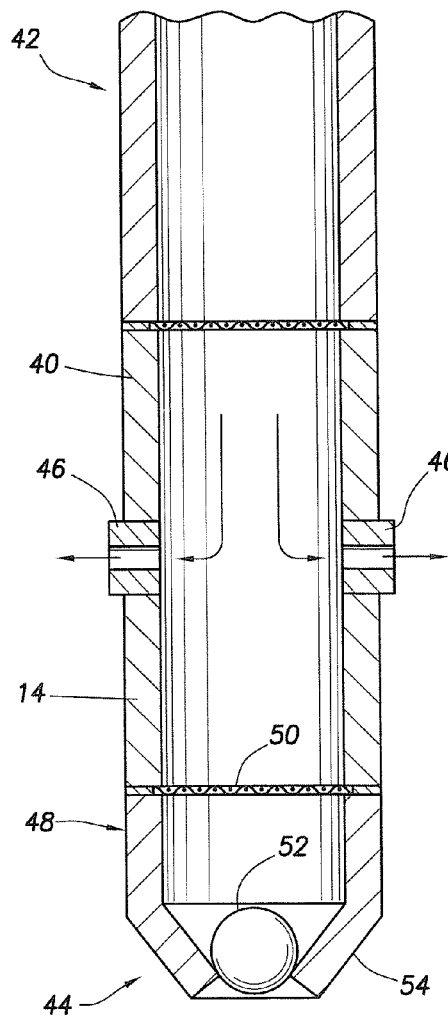
FIGS. 11A and 11B illustrate operation of a hydrajetting tool for use in carrying out the methods according to the present invention.
Figure 11B:
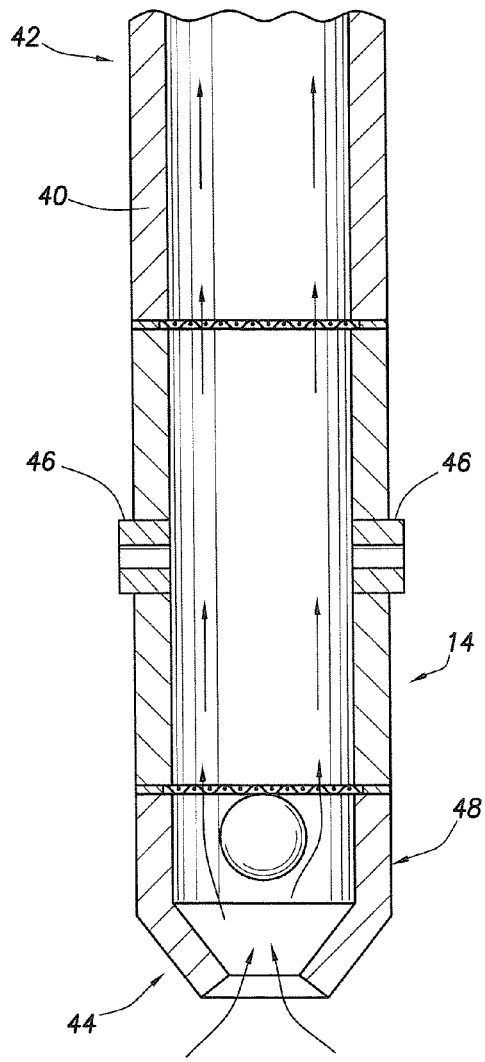

FIGS. 11A-B illustrate the details of the hydrajetting tool 14 for use in carrying out the methods of the present invention. Hydrajetting tool 14 comprises a main body 40, which is cylindrical in shape and formed of a ferrous metal. The main body 40 has a top end 42 and a bottom end 44. The top end 42 connects to coil tubing 18 for operation within the wellbore 10. The main body 40 has a plurality of nozzles 46, which are adapted to direct the high pressure fluid out of the main body 40. The nozzles 46 can be disposed, and in one certain embodiment are disposed, at an angle to the main body 40, so as to eject the pressurized fluid out of the main body 40 at an angle other than 90° F.

The hydrajetting tool 14 further comprises means 48 for opening the hydrajetting tool 14 to fluid flow from the wellbore 10. Such fluid opening means 48 includes a fluid-permeable plate 50, which is mounted to the inside surface of the main body 40. The fluid-permeable plate 50 traps a ball 52, which sits in seat 54 when the pressurized fluid is being ejected from the nozzles 46, as shown in FIG. 11A. When the pressurized fluid is not being pumped down the coil tubing into the hydrajetting tool 14, the wellbore fluid is able to be circulated up to the surface via opening means 48. More specifically, the wellbore fluid lifts the ball 52 up against fluid-permeable plate 50, which in turn allows the wellbore fluid to flow up the hydrajetting tool 14 and ultimately up through the coil tubing 18 to the surface, as shown in FIG. 11B. As those of ordinary skill in the art will recognize other valves can be used in place of the ball and seat arrangement 52 and 54 shown in FIGS. 11A and 11B. Darts, poppets, and even flappers, such as a balcomp valves, can be used. Furthermore, although FIGS. 11A and 11B only show a valve at the bottom of the hydrajetting tool 14, such valves can be placed both at the top and the bottom, as desired.

Yet another method in accordance with the present invention will now be described. First, the first zone 16 in the subterranean formation 12 is perforated by injecting a perforating fluid through the hydrajetting tool 14 into the subterranean formation, so as to form perforation tunnels 20, as shown, for example, in FIG. 1A. Next, fractures 24 are initiated in the perforation tunnels 20 by pumping a fracturing fluid through the hydrajetting tool 14, as shown, for example in FIG. 3. The fractures 24 are then propagated by injecting additional fracturing fluid into the fractures through both the hydrajetting tool 14 and annulus 19. The fractures 24 are then plugged, at least partially, by pumping an isolation fluid 28 into the openings of the fractures 24 and/or wellbore section adjacent to the fractures 24. The isolation fluid 28 can be pumped into this region either through the annulus 19, as shown in FIG. 4, or through the hydrajetting tool 14, as shown in FIG. 5, or a combination of both. Once the fractures 24 have been plugged, the hydrajetting tool 14 is moved away from the first zone 16. It can either be moved up hole for subsequent fracturing or downhole, e.g., when spotting a fluid across perforations for sealing where it is desired to pump the chemical from a point below the zone of interest to get full coverage—the tool is then pulled up through the spotted chemical. Lastly, these steps or a subset thereof, are repeated for subsequent zones of the subterranean formation 12.

According to all of these exemplary examples of the invention, at least a portion of at least one of the fracturing fluid and the isolation fluid comprises a viscoelastic surfactant fluid. Without being limited by any theoretical explanation, a viscoelastic surfactant fluid is expected to improve cleanup and help reduce damage to the formation.

As is well known in the art, a positioning device, such as a gamma ray detector or casing collar locator (not shown), can be included in the bottom hole assembly to improve the positioning accuracy of the perforations.

The methods according to the invention can optionally further comprise the step of overflushing the acidizing composition in the formation with an overflush fluid capable of displacing at least some of the acidizing composition farther out into the formation. The overflush fluid is preferably an aqueous solution. The step of overflushing can be at the tail end of the step of fracturing the formation. More preferably, however, the step of overflushing the acidizing composition further comprises: delivering the overflush fluid through the jetting tool and to the formation under conditions that are not sufficient to initiate a fracture in the formation. There may be some overlap in the introduction of the acidizing fluid and the overflush fluid, for example, in cases where separate pumping devices are used.

Preferably, the overflush fluid is placed into the formation at a matrix flow rate such that the acidizing fluid is displaced from near the wellbore. Generally, the volume of overflush fluid placed in the subterranean formation ranges from about 0.1 to about 50 times the volume of the acidizing fluid. In some embodiments of the present invention, the volume of overflush fluid placed in the subterranean formation ranges from about 2 to about 5 times the volume of the acidizing fluid.

It is to be understood that in various embodiments, additives can be included with either or both of the fracturing fluid and the isolation fluid used in the present invention, such a gas ($N_2$ or $CO_2$), corrosion inhibitor, scale inhibitor, nonemulsifying surfactant, other surfactants, polymer gelling agents, hydrate inhibitors, asphatene inhibitors, paraffin inhibitors, mutual solvents, alcohols, oxidizers, and reducers.

The method according to the invention preferably further comprise the step of flowing back or producing fluid from the formation.

It is to be understood that the various steps according to preferred methods of the invention can be advantageously practiced in various combinations. It is also to be understood that the steps according to the invention and various preferred embodiments of the invention can be repeated at different intervals of the same wellbore.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of fracturing a production interval of a subterranean formation adjacent a wellbore that is open hole or has an uncemented liner, the method comprising the steps of:
   (a) perforating a zone of the production interval by injecting a pressurized fluid through a hydrajetting tool into the subterranean formation, so as to form one or more perforation tunnels; and
   (b) injecting a fracturing fluid into the one or more perforation tunnels so as to create at least one fracture along each of the one or more perforation tunnels; wherein at least a portion of at least one of the pressurized fluid and the fracturing fluid comprises a viscoelastic surfactant fluid.

2. The method according to claim 1, further comprising the steps of:
   (c) plugging at least partially the one or more fractures in the zone with an isolation fluid; and
   (d) repeating steps (a) and (b) in a second zone of the production interval.

3. The method according to claim 2, wherein the pressurized fluid, the fracturing fluid, and the isolation fluid are substantially free of polymeric materials.

4. The method according to claim 3, wherein the wellbore is of an injection well.

5. The method according to claim 2, wherein at least a portion of at least one of the fracturing fluid and the isolation fluid further comprises an acidizing fluid for etching the formation.

6. The method according to claim 5, wherein the step of injecting a fracturing fluid further comprises injecting a viscoelastic surfactant fluid and an acidizing fluid as a commingled fluid or intermittently.

7. The method according to claim 5, further comprising the step of displacing the acidizing fluid farther into the formation.

8. The method according to claim 2, wherein the fracturing fluid comprises a proppant.

9. The method according to claim 8, wherein the isolation fluid does not include any substantial amount of particulate that is substantially smaller than the proppant to avoid plugging the interstitial spaces between the proppant placed in the fracture with smaller particulate.

10. The method according to claim 1, wherein the pressurized fluid being injected into the subterranean formation through the hydrajetting tool during step (a) comprises abrasive solids.

11. The method according to claim 1, wherein the step of injecting the fracturing fluid further comprises: injecting the fracturing fluid through the hydrajetting tool into the one or more perforation tunnels so as to create at least one fracture along each of the one or more perforation tunnels.

12. The method according to claim 11, further comprising the step of: pumping additional fracturing fluid into the one or more fractures in the zone through a wellbore annulus in which the hydrajetting tool is disposed so as to propagate the fracture.

13. The method according to claim 1, wherein the fracturing fluid comprises a solid or semisolid material.

14. The method according to claim 13, wherein the solid material comprises a proppant agent.

15. The method according to claim 2, further comprising the step of removing the isolation fluid from the zone.

16. The method according to claim 15, wherein the step of removing the isolation fluid from the zone is performed by circulating the isolation fluid out of the wellbore.

17. The method according to claim 15, wherein the step of removing the isolation fluid from the zone is performed by hydrajetting the isolation fluid out of the wellbore.

18. The method according to claim 1, wherein the step of perforating is performed remedially that is after an earlier perforation step has been performed in the well.

19. A method of fracturing a production interval of a subterranean formation adjacent a wellbore that is open hole or has an uncemented liner, the method comprising the steps of:
   (a) perforating a zone of the production interval by injecting a pressurized fluid through a hydrajetting tool into the subterranean formation, so as to form one or more perforation tunnels;
   (b) injecting a fracturing fluid into the one or more perforation tunnels so as to create at least one fracture along each of the one or more perforation tunnels; and
   (c) plugging at least partially the one or more fractures in the zone with an isolation fluid; wherein at least a portion of at least one of the pressurized fluid, the fracturing fluid, and the isolation fluid comprises a viscoelastic surfactant fluid.

20. The method according to claim 19, further comprising: repeating steps (a) through (c) in a second zone of the subterranean formation.

21. The method according to claim 19, wherein the step of perforating is performed remedially after an earlier perforation step has been performed in the well.

22. A method of fracturing a production interval of a subterranean formation adjacent a wellbore that is open hole or has an uncemented liner, the method comprising the steps of:
   (a) perforating a zone of the subterranean formation by injecting a pressurized fluid through a hydrajetting tool into the subterranean formation, so as to form one or more perforation tunnels;
   (b) initiating one or more fractures in the zone of the subterranean formation by injecting a fracturing fluid through the hydrajetting tool into the one or more perforation tunnels;
   (c) pumping additional fracturing fluid into the one or more fractures in the zone through a wellbore annulus in which the hydrajetting tool is disposed so as to propagate the fracture, wherein at least a portion of the pressurized fluid and the fracturing fluid comprises a viscoelastic surfactant fluid.

23. The method according to claim 22, further comprising the step of: repeating steps (a) through (c) in a second zone of the subterranean formation.

24. The method according to claim 23, further comprising the step of: plugging at least partially the one or more fractures in the zone with an isolation fluid prior to repeating steps (a) through (c) in a second zone of the subterranean formation.

25. The method according to claim 24, wherein at least a portion of the isolation fluid comprises a viscoelastic surfactant fluid.

26. The method according to claim 24, wherein at least one of pressurized fluid, the fracturing fluid, and the isolation fluid further comprises an acid for etching the formation.

27. The method according to claim 24, the pressurized fluid, the fracturing fluid, and the isolation fluid are substantially free of polymeric materials.

28. The method according to claim 22, wherein substantially all of the pressurized fluid, the fracturing fluid, and the isolation fluid comprise a viscoelastic surfactant fluids.

29. The method according to claim 22, wherein the step of perforating is performed remedially after an earlier perforation step has been performed in the well.

* * * * *